US012798063B2

(12) United States Patent
Chen et al.

(10) Patent No.: US 12,798,063 B2
(45) Date of Patent: Nov. 17, 2026

(54) IMPACT TOOL

(71) Applicant: Nanjing Chervon Industry Co., Ltd., Nanjing (CN)

(72) Inventors: Shuai Chen, Nanjing (CN); Hongtao Ke, Nanjing (CN); Yongkang Wu, Nanjing (CN); Chenwei Sun, Nanjing (CN); Baofeng Fan, Nanjing (CN); Rui Xu, Nanjing (CN); Meng Xue, Nanjing (CN); Shubin Tong, Nanjing (CN); Di Wu, Nanjing (CN); Jia Gou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 460 days.

(21) Appl. No.: 18/495,369

(22) Filed: Oct. 26, 2023

(65) Prior Publication Data

US 2024/0217077 A1 Jul. 4, 2024

(30) Foreign Application Priority Data

Jan. 4, 2023 (CN) ......................... 202310007703.6
Jan. 18, 2023 (CN) ......................... 202320142955.5
Apr. 7, 2023 (CN) ......................... 202310373618.1

(51) Int. Cl.
*B25B 23/147* (2006.01)
*B25B 21/02* (2006.01)
(Continued)

(52) U.S. Cl.
CPC .......... *B25B 23/1475* (2013.01); *B25B 21/02* (2013.01); *H02P 23/24* (2016.02); *H02P 27/06* (2013.01); *B25B 21/002* (2013.01)

(58) Field of Classification Search
CPC .. B25F 5/00; B25F 5/008; B25F 5/021; B25B 21/00; B25B 21/02; B25B 23/02; B25B 23/14; B25B 23/1405; B25B 23/141; B25B 23/1415; B25B 23/147; B25B 23/1475; B25D 11/02; B25D 11/04; B25D 16/006; B25D 17/06; B25D 2216/0023; B25D 2217/0015; B25D 2250/005; B25D 2250/221; H02P 1/028; H02P 1/22; H02P 6/06; H02P 6/24; H02P 6/30; H02P 23/24; H02P 27/06; H02P 27/08
See application file for complete search history.

(56) References Cited

U.S. PATENT DOCUMENTS

2013/0014967 A1 1/2013 Ito
2013/0025892 A1 * 1/2013 Mashiko ............... B25B 21/026
173/2
(Continued)

FOREIGN PATENT DOCUMENTS

EP 4056321 A1 * 9/2022 ............. B25D 11/04

*Primary Examiner* — Robert J Scruggs
(74) *Attorney, Agent, or Firm* — Greenberg Traurig, LLP

(57) ABSTRACT

An impact tool includes a controller for controlling a motor. The controller is configured to, when the direction of rotation of the motor is set to the reverse rotation direction, a drive shaft rotates at a first speed, and after an impact mechanism applies an impact force to an output shaft for a preset time, determine that a fastener is in a tightened state according to a load parameter of the output shaft and control the drive shaft to rotate at a second speed, where the second speed is greater than the first speed.

20 Claims, 14 Drawing Sheets

(51) Int. Cl.

| | |
|---|---|
| ***H02P 23/24*** | (2016.01) |
| ***H02P 27/06*** | (2006.01) |
| *B25B 21/00* | (2006.01) |

(56) References Cited

U.S. PATENT DOCUMENTS

2016/0079887 A1* 3/2016 Takano .................. H02P 1/028 318/431
2016/0121467 A1* 5/2016 Ng ..................... B25B 23/1475 81/464

* cited by examiner

IMPACT TOOL

RELATED APPLICATION INFORMATION

This application claims the benefit under 35 U.S.C. § 119(a) of Chinese Patent Application No. 202310007703.6, filed on Jan. 4, 2023, Chinese Patent Application No. 202320142955.5, filed on Jan. 18, 2023, and Chinese Patent Application No. 202310373618.1, filed on Apr. 7, 2023, which applications are incorporated herein by reference in their entireties.

TECHNICAL FIELD

The present application relates to a power tool and, in particular, to an impact tool.

BACKGROUND

A power tool in the related art, such as an impact wrench, uses a reverse rotation mode when removing a fastener such as a nut or a bolt. In the reverse rotation mode, a relatively large duty cycle is generally set so that a motor starts at full speed and stops or slows down after the power tool detects the fastener is loosened.

Since the nut and the bolt become rusted or deformed during use, the impact wrench cannot remove the nut or bolt. As a result, the same impact tool can tighten but cannot loosen the fastener.

This part provides background information related to the present application, which is not necessarily the existing art.

SUMMARY

An impact tool includes a controller for controlling a motor. The controller is configured such that when the direction of rotation of the motor is set to a reverse rotation direction, a drive shaft rotates at a first speed. Optionally, after an impact mechanism applies an impact force to an output shaft for a preset time, it is determined that a fastener is in a tightened state according to a load parameter of the output shaft and the drive shaft is controlled to rotate at a second speed, where the second speed is greater than the first speed.

In some examples, the impact tool includes a motor including a drive shaft rotating about a first axis; an output shaft for outputting torque externally to operate a fastener; an impact mechanism for applying an impact force to the output shaft; and a switching portion configured to set the direction of rotation of the motor to a forward rotation direction in which the fastener is tightened or a reverse rotation direction in which the fastener is loosened.

In some examples, the impact tool further includes a speed regulation portion, where the rotational speed of the drive shaft is adjusted according to a trigger stroke of the speed regulation portion.

In some examples, the first speed is configured to be a speed at which the drive shaft rotates when the trigger stroke of the speed regulation portion is adjusted to a limit.

In some examples, the impact tool further includes a detection mechanism for detecting the load parameter of the output shaft and an impact state of the impact mechanism.

In some examples, the controller acquires an output signal of the detection mechanism, determines that the fastener is in the tightened state according to the output signal, and sends a signal to the motor to control the drive shaft to rotate at the second speed.

In some examples, the detection mechanism includes a first detection assembly for detecting the impact state of the impact mechanism, where the first detection assembly includes an impact detection portion for determining that the impact mechanism starts to apply the impact force to the output shaft.

In some examples, the detection mechanism includes a first detection assembly for detecting the impact state of the impact mechanism, where the first detection assembly includes an impact state detection portion for detecting an impact time parameter of the impact mechanism.

In some examples, the detection mechanism includes a second detection assembly for detecting the load parameter of the output shaft, where the load parameter of the output shaft includes at least one of the rotational speed of the output shaft, the angle of rotation of the output shaft, and the rotational acceleration of the output shaft.

In some examples, the detection mechanism includes a third detection assembly for detecting the load parameter of the output shaft, where the load parameter of the output shaft includes at least one of the rotational speed of the motor, the current of the motor, a motor commutation parameter, and freewheeling time.

In some examples, the controller is configured to limit the torque output of the motor when the direction of rotation of the motor is set to reverse rotation and it is determined that the load of the output shaft is reduced or less than or equal to a preset load according to the load parameter of the output shaft.

In some examples, the tightening torque of the impact tool for the fastener when the motor rotates at the first speed is first output torque, and the tightening torque of the impact tool for the fastener when the motor rotates at the second speed is second output torque, where the first output torque is less than the second output torque.

In some examples, the output power of the motor when the motor rotates at the first speed is first output power, and the output power of the motor when the motor rotates at the second speed is second output power, where the first output power is less than the second output power.

In some examples, the controller is further configured to, when the direction of rotation of the motor is set to the reverse rotation direction, control the motor to start with a first duty cycle signal, determine that the fastener is in the tightened state according to the load parameter of the output shaft, and adjust the motor such that the motor operates with a second duty cycle signal, where a first duty cycle is less than a second duty cycle.

In some examples, when the direction of rotation of the motor is set to the reverse rotation direction, the motor is controlled to start with the first duty cycle signal, it is determined that the fastener is in a loosened state according to the load parameter of the output shaft, and the controller controls the motor to operate with the first duty cycle signal.

In some examples, the impact mechanism includes a main shaft driven by the drive shaft, an impact block driven by the main shaft, and a hammer anvil that mates with the impact block and is struck by the impact block.

In some examples, the impact block is rotatable and axially movable relative to the hammer anvil to apply a continuous rotational impact to the hammer anvil.

An impact tool includes a controller for controlling a motor. The controller is configured to, when the direction of rotation of the motor is set to the reverse rotation direction, detect a parameter indicating the load of an output shaft, determine that a fastener is in a tightened state according to the load parameter of the output shaft, and automatically send the motor a signal for improving the speed of a drive shaft.

In some examples, the impact tool includes a motor including a drive shaft rotating about a first axis; an output shaft for outputting torque externally to operate a fastener; an impact mechanism for applying an impact force to the output shaft; and a switching portion configured to set the direction of rotation of the motor to a forward rotation direction in which the fastener is tightened or a reverse rotation direction in which the fastener is loosened.

An impact tool includes a controller for controlling a motor. The controller is configured to, when the direction of rotation of the motor is set to the reverse rotation direction, control the motor to start with a first duty cycle signal, and when it is determined that a fastener is in a tightened state according to a load parameter of an output shaft, adjust the motor such that the motor operates with a second duty cycle signal, where a first duty cycle is less than a second duty cycle.

In some examples, the impact tool includes a motor including a drive shaft rotating about a first axis; an output shaft for outputting torque externally to operate a fastener; an impact mechanism for applying an impact force to the output shaft; and a switching portion configured to set the direction of rotation of the motor to a forward rotation direction in which the fastener is tightened or a reverse rotation direction in which the fastener is loosened.

In some examples, the controller is configured to, when the direction of rotation of the motor is set to the reverse rotation direction, control the motor to start with the first duty cycle signal, where when it is determined that the load of the output shaft is less than or equal to a preset load according to the load parameter of the output shaft, the motor keeps operating with the first duty cycle signal.

In some examples, when the controller controls the motor to operate with the first duty cycle signal, the controller limits the torque output of the motor according to an operation instruction of a user.

In some examples, when the controller controls the motor to operate with the second duty cycle signal and it is determined that the load of the output shaft is reduced or less than or equal to the preset load according to the load parameter of the output shaft, the controller limits the torque output of the motor.

DETAILED DESCRIPTION

Figure 1:
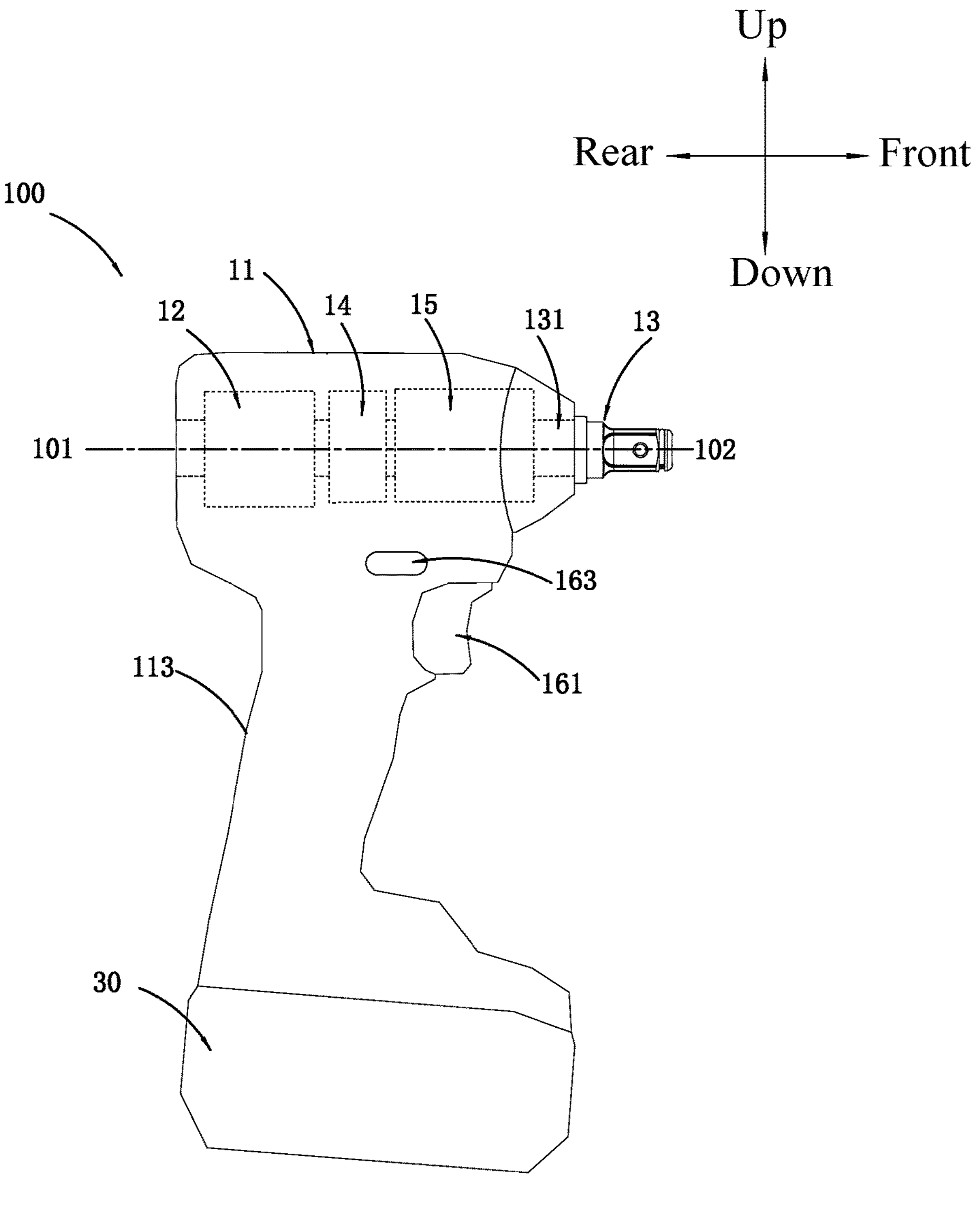
FIG. 1 is a structural view of an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In the present application, the terms "controller", "processor", "central processing unit", "CPU", and "microcontroller unit (MCU)" are interchangeable. Where a unit such as the "controller", the "processor", the "central processing unit", the "CPU", or the "MCU" is used to implement specific functions, these functions may be implemented by a single one of the preceding units or multiple preceding units unless otherwise indicated.

In the present application, the term "device", "module", or "unit" is used to implement a specific function in the form of hardware or software.

In the present application, the terms "computing", "judging", "controlling", "determining", "identifying", and the like refer to the operations and processes of a computer system or similar electronic computing device (for example, the controller, the processor, or the like).

To clearly illustrate technical solutions of the present application, an upper side, a lower side, a front side, and a rear side shown in FIG. 1 are further defined.

Figure 2:
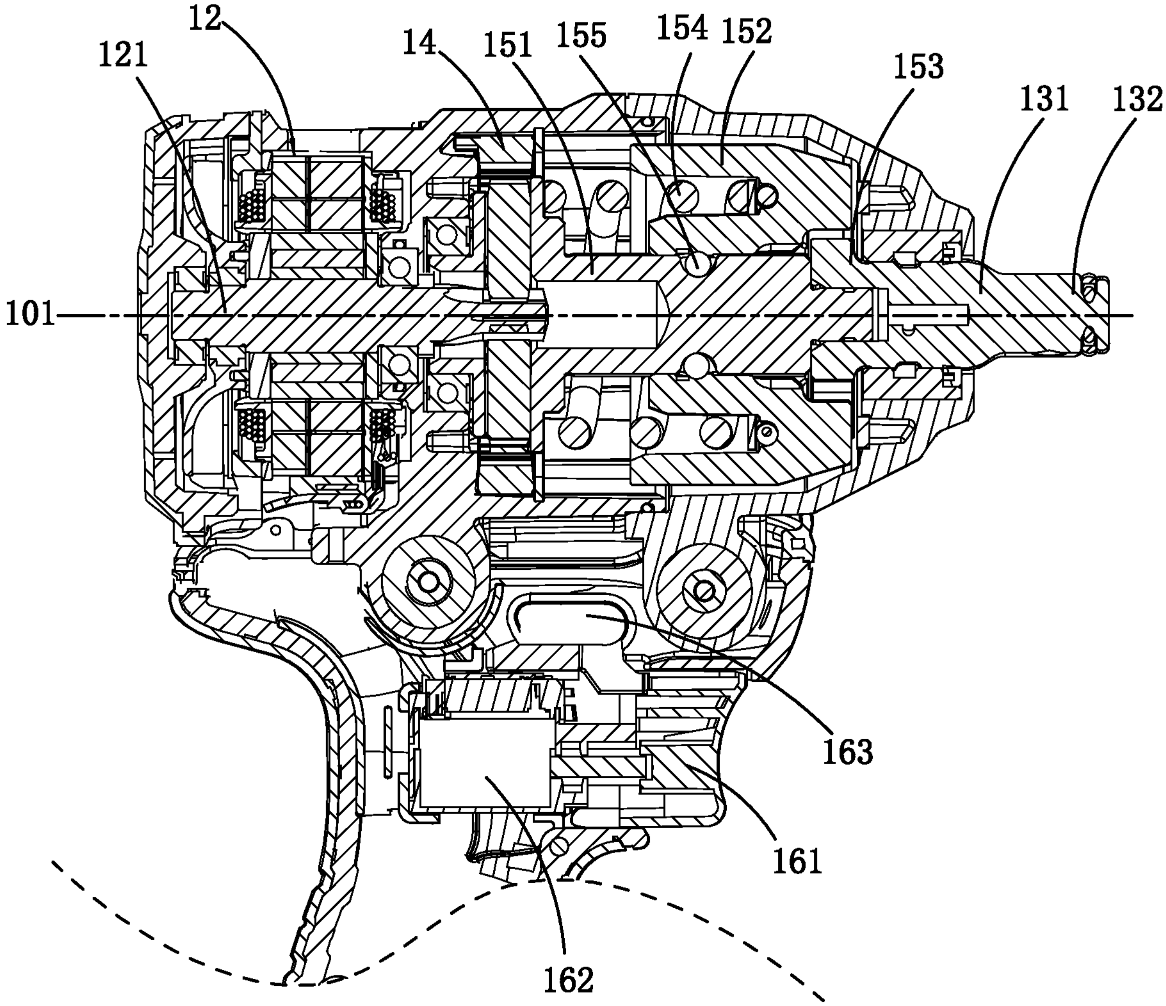
FIG. 2 is a sectional view of some components in FIG. 1.

FIGS. 1 and 2 show an impact tool in an example of the present application. The impact tool is an impact wrench 100. It is to be understood that in other alternative examples, different work attachments may be mounted to the impact tool. The impact tool with one of these different work attachments may be, for example, an impact drill or an impact screwdriver.

The impact wrench 100 includes a power supply 30. The power supply 30 is used for supplying electrical energy to the impact wrench 100. In this example, the power supply 30 is a direct current power supply. Optionally, the direct current power supply is a battery pack, and the battery pack mates with a corresponding power supply circuit to supply power to the impact wrench 100. It is to be understood by those skilled in the art that the power supply 30 is not limited to the scenario where the battery pack is used, and the power may be supplied to the corresponding component through mains power or an alternating current power supply in conjunction with the corresponding rectifier circuit, filter circuit, and voltage regulator circuit.

As shown in FIGS. 1 and 2, the impact wrench 100 includes a housing 11, a motor 12, an output mechanism 13, a transmission mechanism 14, and an impact mechanism 15. The motor 12 includes a drive shaft 121 rotating about a first axis 101. In this example, the motor 12 is specifically an electric motor 12. The electric motor 12 is used below instead of the motor 12, and a motor shaft 121 is used below instead of the drive shaft 121, which cannot serve as a limitation to the present application.

The output mechanism 13 includes an output shaft 131 for connecting a work attachment and driving the work attachment to rotate. A clamping assembly 132 is disposed at the front end of the output shaft 131 and may clamp corresponding work attachments, such as a screwdriver, a drill bit, and a sleeve, when different functions are implemented.

The output shaft 131 is used for outputting torque externally so as to operate a fastener. The output shaft 131 rotates about an output axis. In this example, the output axis is a second axis 102. In this example, the first axis 101 coincides with the second axis 102. In other alternative examples, a certain included angle exists between the second axis 102 and the first axis 101. In other alternative examples, the first axis 101 and the second axis 102 are parallel to each other but do not coincide with each other.

The impact mechanism 15 is used for applying an impact force to the output shaft 131. The impact mechanism 15 includes a main shaft 151, an impact block 152 sleeved on the circumference of the main shaft 151, a hammer anvil 153 disposed at the front end of the impact block 152, and an elastic element 154. The hammer anvil 153 is connected to the output shaft 131. In this example, the hammer anvil 153 includes an anvil, and the output shaft 131 is formed at the front end of the anvil. It is to be understood that the anvil and the output shaft 131 may be integrally formed or separately formed as independent parts.

The impact block 152 includes an impact block body and a pair of first end teeth which are symmetrically disposed on the front end surface of the impact block body in a radial direction and protrude from the front end surface of the impact block body. A pair of second end teeth are symmetrically disposed on the rear end surface of the anvil opposite to the impact block in the radial direction and protrude from the rear end surface of the anvil. The impact block 152 is driven by the main shaft 151, and the hammer anvil 153 mates with the impact block 152 and is struck by the impact block 152.

The impact block 152 is supported on the main shaft 151, rotates integrally with the main shaft 151, and is slidable relative to the main shaft 151 in a reciprocating manner in the axial direction of the main shaft. In this example, the axis of the main shaft coincides with the axis of the motor shaft. Therefore, the impact block 152 slides and rotates relative to the main shaft 151 in a reciprocating manner along the direction of the first axis 101. In other alternative examples, the axis of the main shaft may be parallel to the axis of the motor shaft but does not coincide with the axis of the motor shaft.

The elastic element 154 provides a force for the impact block 152 to approach the hammer anvil 153. In this example, the elastic element 154 is a coil spring.

A pair of first ball grooves opened forward and extending backward along the front and rear direction are disposed on the front end surface of the impact block 152. A pair of second ball grooves are formed on the outer surface of the main shaft 151. The impact mechanism 15 further includes rolling balls 155. The rolling ball 155 straddles the first ball groove and the second ball groove so that the impact block 152 is connected to the main shaft 151. In this example, the rolling balls 155 are steel balls. Since inwardly concave V-shaped grooves are separately provided on the impact block 152 and the main shaft 151 and jointly form a ball channel. The rolling ball 155 is disposed between the impact block 152 and the main shaft 151 and is embedded in the ball channel so that the main shaft 151 can drive the impact block 152 to rotate through the rolling ball 155, and the impact block 152 mates with the hammer anvil 153 to drive the hammer anvil to rotate, thereby driving the output shaft 131 to rotate.

The transmission mechanism 14 is disposed between the electric motor 12 and the impact mechanism 15. The transmission mechanism 14 is used for transmitting power between the motor shaft 121 and the main shaft 151. In this example, the transmission mechanism 14 is decelerated by a planet gear. The working principle according to which the planet gear performs the deceleration and the deceleration implemented by the transmission mechanism have been completely disclosed to those skilled in the art. Therefore, a detailed description is omitted herein for the brevity of the specification.

When the impact wrench 100 is load-free, the impact mechanism 15 does not perform the impact. The impact mechanism 15 plays a transmission role and transmits the rotation of the electric motor 12 to the output shaft 131. When a load is applied to the impact wrench 100, the rotation of the output shaft 131 is blocked. The rotational speed of the output shaft 131 may be reduced or the output shaft 131 may completely stop rotating due to different magnitudes of loads. When the output shaft 131 completely stops rotating, the hammer anvil 153 also stops rotating. Due to the limiting action of the hammer anvil 153 on the impact block 152 in a circumferential direction, the impact block 152 also stops rotating. However, the main shaft 151 continues rotating such that the ball 155 is pressed to move along the trajectory of the ball channel, thereby driving the impact block 152 to be displaced backward along a main shaft axis. While the impact block 152 is displaced backward, the impact block 152 presses the elastic element 154 until the hammer anvil 153 is completely separated from the impact block 152. At this time, the main shaft 151 drives the impact block 152 to rotate at a certain rotational speed, and the elastic element 154 rebounds along an axial direction. When the impact block 152 rotates to be in contact with the hammer anvil 153, the impact block 152 applies the impact force to the hammer anvil 153. Under the action of this impact force, the output shaft 131 overcomes the load and continues rotating by a certain angle, and then the output shaft 131 stops rotating again. The preceding process is repeated. Since an impact frequency is high enough, a relatively continuous impact force is applied to the output shaft so that the work attachment continues working.

Figure 3:
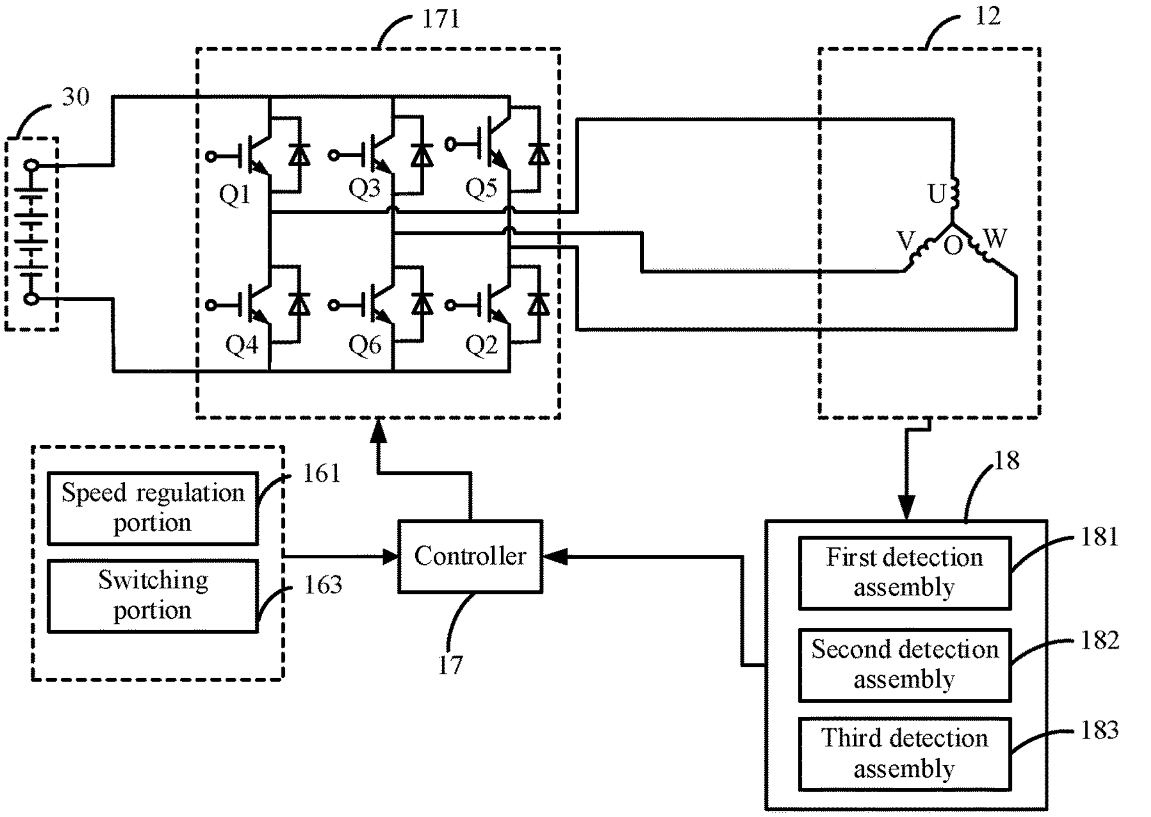
FIG. 3 is a circuit block diagram according to an example of the present application.
Figure 4:
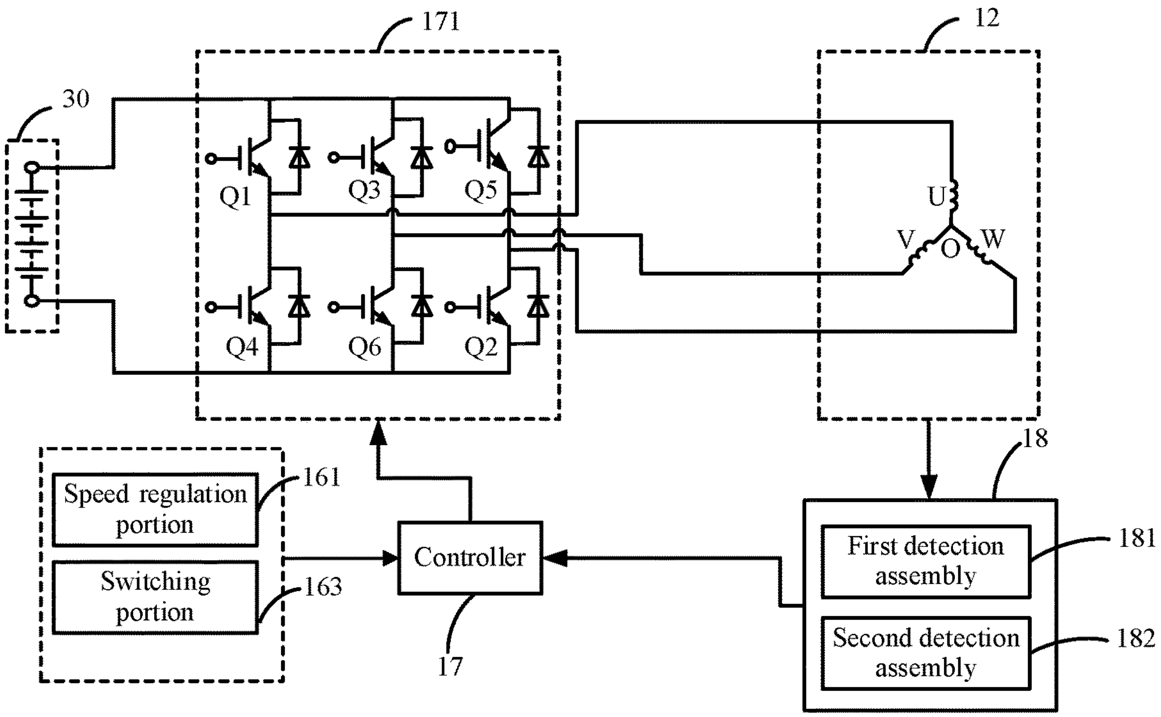
FIG. 4 is another circuit block diagram according to an example of the present application.
Figure 5:
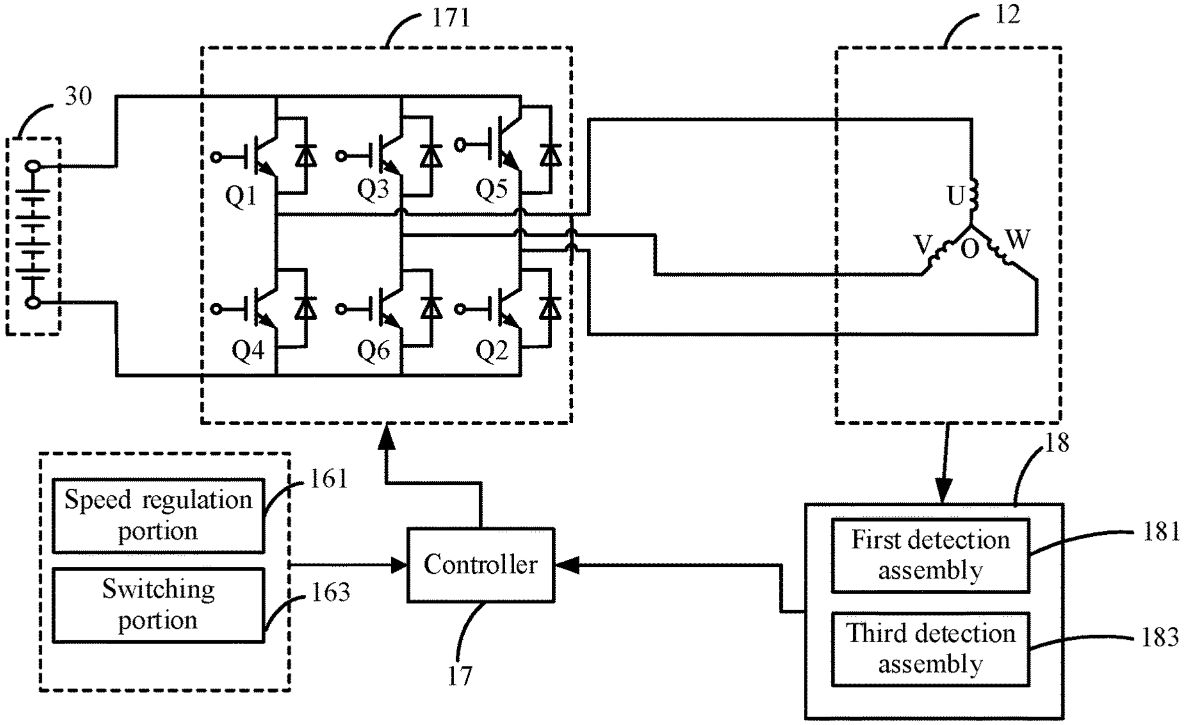
FIG. 5 is a third circuit block diagram according to an example of the present application.

As shown in FIGS. 3 to 5, the electric motor 12 includes stator windings and a rotor. In some examples, the electric motor 12 is a three-phase brushless motor and includes the rotor with a permanent magnet and three phases of stator windings U, V, and W electronically commutated. In some examples, the three phases of stator windings U, V, and W adopt a star connection. In other examples, the three phases of stator windings U, V, and W adopt a delta connection. However, it is to be understood that other types of brushless motors are also within the scope of the present disclosure. The brushless motor may include less than or more than three phases.

A control circuit of the impact wrench 100 includes a driver circuit 171 and a controller 17. The driver circuit 171 is electrically connected to the stator windings U, V, and W of the electric motor 12 and used for transmitting the current from the power supply 30 to the stator windings U, V, and W so as to drive the electric motor 12 to rotate. In an example, the driver circuit 171 includes multiple switching elements Q1, Q2, Q3, Q4, Q5, and Q6. The gate terminal of each switching element is electrically connected to the controller and used for receiving a control signal from the controller. The drain or source of each switching element is connected to the stator windings U, V, and W of the electric motor 12. The switching elements Q1 to Q6 receive control signals from the controller to change respective conduction states, thereby changing the current loaded to the stator windings U, V, and W of the electric motor 12 by the power supply 30. In an example, the driver circuit 171 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches such as the IGBTs or the BJTs.

As shown in FIGS. 1 to 5, the impact wrench 100 further includes a speed regulation portion 161 and a switching portion 163. The speed regulation portion 161 is a trigger switch. A grip 113 is formed on the housing 11. The trigger switch is disposed on the grip 113 and used for the user to operate and input an operation instruction. The rotational speed of the electric motor 12 is adjusted according to the trigger stroke of the trigger switch. In this example, the trigger switch is coupled with a sliding rheostat 162, and when the trigger strokes of the trigger switch are different, the analog signals outputted by the sliding rheostat 162 are different.

In this example, the controller 17 is used for controlling the electric motor 12. The controller controls the ratio of the on-time to the off-time of the switching element in the driver circuit 171 based on a pulse-width modulation (PWM) signal.

Optionally, the trigger stroke of the trigger switch is positively correlated to the duty cycle of the PWM signal of the electric motor 12, and the duty cycle of the PWM signal is positively correlated to the rotational speed of the electric motor 12. When the trigger stroke of the trigger switch is relatively small, the duty cycle of the PWM signal is also relatively small, and in this case, the rotational speed of the electric motor 12 is also relatively small.

In some examples, the mapping relationship between the trigger stroke of the trigger switch and the PWM signal is stored in the impact wrench 100, where the mapping relationship may be linear or non-linear, which is not limited in the examples of the present application.

The controller 17 is disposed on a control circuit board, where the control circuit board includes a printed circuit board (PCB) and a flexible printed circuit (FPC) board. The controller 17 uses a dedicated control chip, for example, a single-chip microcomputer and an MCU. Specifically, the controller 17 controls the on or off states of the switching elements in the driver circuit 171 through the control chip. The control chip controls the switching elements in the driver circuit 171 to be in the on or off states according to the control signals from the controller 17. It is to be noted that the control chip may be integrated into the controller 17 or may be disposed independently of the controller 17. The structural relationship between a driver chip and the controller 17 is not limited in this example.

The switching portion 163 is disposed on the upper side of the trigger switch and configured to be operated to set the direction of rotation of the motor to a forward rotation direction in which the fastener is tightened or a reverse rotation direction in which the fastener is loosened.

In this example, when the direction of rotation of the electric motor 12 is set to the reverse rotation direction, the motor shaft 121 rotates at a first speed, and after the impact mechanism 15 applies the impact force to the output shaft 131 for a preset time, the controller 17 determines that the fastener is in a tightened state according to a load parameter of the output shaft 131 and controls the drive shaft to rotate at a second speed, where the second speed is greater than the first speed.

The first speed is the speed at which the electric motor 12 rotates when the trigger stroke of the speed regulation portion 161 is adjusted to the limit. Optionally, the first speed is configured such that the controller 17 controls the driver circuit 171 to output a drive signal with the maximum duty cycle to control the electric motor 12 to operate at full speed during reverse operation.

In the related art, when the impact wrench 100 performs reverse rotation disassembly work, the electric motor 12 generally operates at the maximum speed to improve the disassembly efficiency. When the fastener that needs to be removed is rusted or deformed, the fastener cannot be loosened even with the maximum rotational speed output. In this example, in addition to the preceding normal reverse rotation working mode (hereinafter referred to as the normal working mode), the impact wrench 100 is further configured with an extreme speed working mode. In the extreme speed working mode, the drive shaft 121 operates at the second speed. The second speed is greater than the maximum speed that the speed regulation portion 161 can adjust. When the impact wrench 100 works at the second speed, the impact wrench 100 provides a capability beyond the rated output of the impact wrench 100. Optionally, the tightening torque of the impact wrench 100 for the fastener when the electric motor 12 rotates at the first speed is first output torque. The tightening torque of the impact wrench 100 for the fastener when the electric motor 12 rotates at the second speed is second output torque, where the first output torque is less than the second output torque.

In the present application, the impact wrench 100 is set to enter the extreme speed mode in which the rotational speed of the electric motor 12 is increased to increase the impact frequency so that the output torque is further increased, thereby loosening the fastener. A parameter indicating the load of the output shaft is detected so that when the parameter satisfies the preset requirement, the controller automatically sends the motor a signal for improving the speed of the drive shaft.

In this example, the controller 17 controls whether to enter the extreme speed working mode by acquiring the load parameter and the impact time parameter of the output shaft. By detecting the impact time and the load parameter of the output shaft, the impact wrench 100 automatically enters the extreme speed working mode and the rotational speed of the electric motor 12 is automatically increased to the second speed, thereby facilitating user operation and making the mode selection more accurate.

As shown in FIGS. 3 to 5, the impact wrench 100 includes a detection mechanism 18 for detecting the load parameter of the output shaft 131 and the impact state of the impact mechanism 15.

In some examples, the detection mechanism 18 includes a first detection assembly 181. The first detection assembly 181 is used for detecting the impact state of the impact mechanism 15. Optionally, the first detection assembly 181 includes an impact detection portion for determining that the impact mechanism 15 starts to apply the impact force to the output shaft 131. The impact detection portion collects the current of the electric motor and determines whether an impact occurs through the abnormal movement of the current during the impact. In other alternative examples, the impact detection portion collects, detects, and determines various physical signals when an impact occurs, such as electrical signals and audio signals, and then feeds back the signals to the controller 17 to determine that the impact mechanism 15 starts to impact the output shaft. In some examples, the impact detection portion determines the demagnetization time by detecting the bus voltage and determines, based on the demagnetization time, whether the impact mechanism 15 starts to impact the output shaft 131. In some examples, the impact detection portion detects the commutation of the electric motor and determines, based on the values or changes of the commutation time, the commutation cycle, and the commutation frequency of the electric motor, whether the impact mechanism 15 starts to impact the output shaft 131.

It has been fully disclosed for those skilled in the art to use the preceding method to determine whether the impact mechanism starts to impact, that is, whether the impact mechanism starts to apply the impact force to the output shaft. Therefore, the above is not intended to limit the essence of the present invention.

The first detection assembly 181 further includes an impact state detection portion for detecting the impact time parameter. The impact time parameter includes the impact duration. In other alternative examples, the impact time parameter includes the number of impacts, or the impact time parameter includes the impact duration and the number of impacts. The impact time parameter may be obtained by detecting the current of the electric motor, the commutation of the electric motor, the effective magnetic field, and the demagnetization time.

In some alternative examples, after the impact detection portion determines that the impact mechanism 15 starts to apply the impact force to the output shaft 131, whether the impact still continues is determined again after a preset time through the impact detection portion by using a timer or delay.

The impact time parameter T1 is detected, and the controller determines the relationship between T1 and the preset time T0. After T1≥T0, the value of the load parameter of the output shaft is determined. If the fastener is still in the tightened state at this time, the impact wrench 100 enters the extreme speed working mode.

In this example, whether the fastener is in the tightened state is determined by comparing the load parameter of the output shaft and a first preset value. Different first preset values are set according to different parameters representing the loads of the output shaft 131.

In some examples, the load parameter of the output shaft is represented by the rotational parameter of the output shaft 131, and the tightening condition of the fastener by the impact wrench 100 is represented by the rotational parameter of the output shaft 131. Optionally, the rotational parameter of the output shaft 131 includes at least one of the rotational speed of the output shaft, the angle of rotation of the output shaft, and the rotational acceleration of the output shaft.

In some examples, the detection mechanism 18 includes a second detection assembly 182. The second detection assembly 182 is used for detecting the rotational parameter of the output shaft 131. The second detection assembly 182 includes a position sensor, which may be a photodiode sensor, a magnetic sensor, or a potentiometer. The second detection assembly 182 may further include a rotation sensor, which may be a gyroscope sensor. The gyroscope sensor may be a single-axis, two-axis, or three-axis microelectromechanical system (MEMS) sensor or a rotation sensor.

A first threshold is preset in the controller 17. The first threshold corresponds to the rotational parameter of the output shaft when the output shaft is load-free or light-load. When the rotational parameter of the output shaft 131 is less than the first threshold, it means that the output torque of the impact wrench 100 at this time is not enough to loosen the fastener, and the fastener is in the tightened state.

In some examples, the load parameter of the output shaft 131 may also be represented by the electrical parameter of the electric motor 12. The detection mechanism 18 includes a third detection assembly 183. The third detection assembly 183 is used for detecting at least one of the rotational speed of the electric motor, the current of the electric motor, the freewheeling time, and a commutation parameter. The controller 17 acquires the detection value of the third detection assembly 183, compares the detection value with a preset threshold, and then determines the load of the output shaft to determine whether the fastener is loosened by the output shaft.

Figure 6:
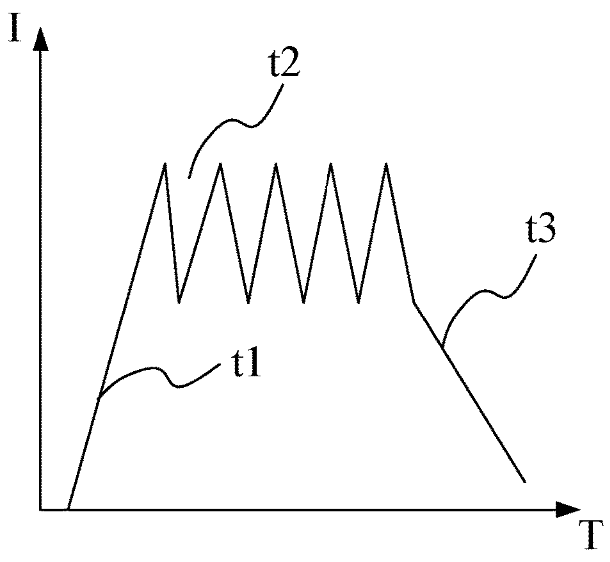
FIG. 6 is a graph illustrating a variation curve of the current value of an electric motor over time during the process of loosening a fastener according to an example of the present application.

The case where the third detection assembly 183 is used for detecting the current of the electric motor 12 is used as an example. As shown in FIG. 6, during the process of loosening the fastener by the impact wrench 100, the current value of the electric motor 12 has the following changing rule: in the stage t1, before the electric motor 12 operates to the maximum rotational speed, the current value of the electric motor 12 gradually increases; then, in the stage t2 when the electric motor 12 is in a loaded state, the current value of the electric motor 12 starts to fluctuate within a certain range due to the load and impact; and after the fastener is loosened, the impact wrench 100 enters the stage t3, and the current value of the electric motor 12 starts to decrease. Therefore, when the current of the electric motor 12 is in a relatively stable fluctuation state, correspondingly, the output shaft 131 is in the loaded state and the fastener is in the tightened state.

In some examples, the bus current value is sampled and obtained after the impact detection portion determines that the impact mechanism 15 applies the impact force to the output shaft 131 for a preset time. The current collected current value is compared with a second threshold. The second threshold may be a load-free or light-load current value. The second threshold may also be another calculated value that can reflect the load-free or light-load current value. If the currently collected current value is greater than or equal to the second threshold, it can be determined that the fastener is in the tightened state. The impact wrench 100 enters the extreme speed working mode, and the controller controls the drive shaft to rotate at the second speed.

In some examples, two or more current values of the electric motor 12 are sampled continuously after the impact detection portion determines that the impact mechanism 15 applies the impact force to the output shaft 131 for a preset time. The current value of the electric motor 12 is compared with the previous adjacent current value. The comparison result of the current value and the previous adjacent current value is compared with a third threshold. The third threshold is the difference between adjacent current values in the stage t2. In the loaded state, since the current is in the stable fluctuation state, the difference in current value is a relatively constant value.

As shown in FIGS. 4 and 5, only one of the second detection assembly 182 and the third detection assembly 183 may be provided according to actual product requirements. In some examples, as shown in FIG. 3, the second detection assembly 182 and the third detection assembly 183 are provided at the same time. The preceding setting method is not limited in this example.

In some examples, when the detection parameter detected by the first detection assembly 181 and the detection parameter detected by the third detection assembly 183 are the same type, the first detection assembly 181 and the third detection assembly 183 can be combined. For example, when both the first detection assembly 181 and the third detection assembly 183 detect the current of the electric motor 12, each of the first detection assembly 181 and the third detection assembly 183 uses a current sense resistor, a Hall current sensor, or metal-oxide-semiconductor field-effect transistor (MOSFET) on-resistance.

The case of increasing the rotational speed of the electric motor 12 to the second speed is described below. In some examples, when the rotational speed of the electric motor 12 switches to the second speed, that is, the impact wrench 100 is in the extreme speed working mode at this time, the controller 17 increases the duty cycle of the electric motor 12 to switch the rotational speed of the motor to the second speed.

Optionally, when the direction of rotation of the electric motor 12 is set to reverse rotation, the electric motor 12 rotates at the first speed, that is, the impact wrench 100 is in the normal working mode at this time, and the conduction angle when the electric motor 12 performs driving is a first set value. When the rotational speed of the electric motor 12 switches to the second speed, that is, the impact wrench 100 is in the extreme speed working mode at this time, the conduction angle when the electric motor 12 performs driving is a second set value, where the first set value is less than the second set value. In some examples, the first set value is 90° to 135°. Optionally, the first set value is 120° and the second set value is 150°. The electric motor 12 performs driving at high speed by increasing the conduction angle.

Optionally, the extreme speed working mode is achieved by changing the power limit of the electric motor 12. When the impact wrench 100 is in the normal working mode, the output power of the electric motor 12 is limited to 80% of the rated power. When the impact wrench 100 enters the extreme speed working mode, the output power of the electric motor 12 is 100% of the rated power. It is to be understood that the output power of the electric motor 12 when the electric motor 12 rotates at the first speed is first output power, and the output power of the electric motor 12 when the electric motor 12 rotates at the second speed is second output power, where the first output power is less than the second output power.

Optionally, when the impact wrench 100 enters the extreme speed working mode, the included angle between the stator flux linkage and the rotor flux linkage of the electric motor 12 is adjusted to be greater than or equal to 90° and less than or equal to 135° so that the rotational speed of the electric motor 12 switches to the second speed.

Optionally, when the direction of rotation of the electric motor 12 is set to reverse rotation, the electric motor 12 rotates at the first speed, that is, the impact wrench 100 is in the normal working mode at this time, and the lead angle when the electric motor 12 performs driving is a third set value. When the rotational speed of the electric motor 12 switches to the second speed, that is, the impact wrench 100 is in the extreme speed working mode at this time, the lead angle when the electric motor 12 performs driving is a fourth set value, where the fourth set value is greater than the third set value. In some examples, when the impact wrench 100 is in the normal working mode, the lead angle when the electric motor 12 performs driving is 0°. When the impact wrench 100 is in the extreme speed working mode, the lead angle when the electric motor 12 performs driving is any angle in the range of 30° to 60°. In this example, the conduction angle of the electric motor 12 remains unchanged. The rotational speed of the electric motor 12, that is, the rotational speed of the motor shaft 121, is adjusted by adjusting the lead angle of the electric motor 12. It is to be explained that the phase windings of the electric motor 12 lead the back electromotive force by an angle, and this angle is the lead angle. Typically, the electric motor 12 is commutated at a fixed lead angle. The rotational speed of the electric motor 12 is adjusted by adjusting the lead angle of the electric motor 12.

In this example, the controller 17 is further configured such that when the direction of rotation of the electric motor 12 is set to reverse rotation, it is determined that the fastener is in a loosened state according to the load parameter of the output shaft, and the controller 17 limits the torque output of the electric motor 12. Optionally, when it is determined that the load of the output shaft is reduced or less than or equal to a preset load according to the load parameter of the output shaft, it is determined that the fastener is in the loosened state. In this example, by using the same preset threshold for determining that the fastener is in the tightened state, it is determined whether the fastener is in the loosened state through different comparison results. When the load parameter of the output shaft is represented by the rotational parameter of the output shaft, the first threshold of the corresponding parameter is preset in the controller 17. The first threshold corresponds to the load-free or light-load output shaft. When the rotational parameter of the output shaft is greater than or equal to the first threshold, it is determined that the fastener is in the loosened state. When the load parameter of the output shaft is represented according to the electrical parameter of the electric motor 12, the same principle is adopted. Therefore, a detailed description is omitted herein for the brevity of the specification.

In some examples, the controller 17 limiting the torque output of the electric motor 12 includes the controller 17 cutting off the power supply of the electric motor 12. In some examples, the controller 17 limiting the torque output of the electric motor 12 includes the controller 17 controlling the speed of the electric motor to be reduced. The torque output of the electric motor 12 is limited so that the fastener is prevented from falling off when the impact wrench 100 loosens the fastener. In this manner, the operation state of the electric motor 12 can be automatically adjusted based on the state of the fastener, thereby improving operational safety.

Figure 7:
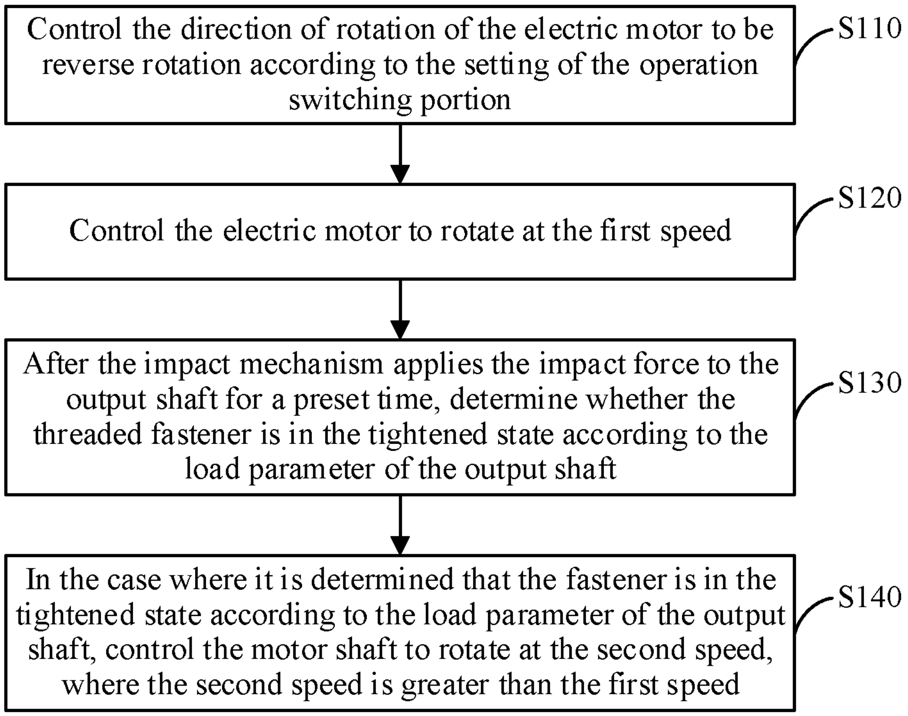
FIG. 7 is a flowchart of a control method for an impact tool according to an example of the present application.

As shown in FIG. 7, this example further discloses a control method for the impact wrench 100. The method specifically includes the steps described below.

In S110, the direction of rotation of the electric motor 12 is controlled to be reverse rotation according to the setting of the operation switching portion 163.

In response to a trigger signal of the switching portion 163 of the impact wrench 100, the controller 17 controls the driver circuit 171 to output a drive signal for causing the electric motor 12 to rotate in reverse, so as to control the electric motor 12 to rotate and operate in reverse.

In S120, the electric motor 12 is controlled to rotate at the first speed.

The controller 17 controls the driver circuit 171 to output a drive signal with the maximum duty cycle to control the electric motor 12 to operate at full speed during reverse operation. It is to be explained that the maximum duty cycle is the duty cycle corresponding to when the trigger stroke of the speed regulation portion 161 is adjusted to the limit.

In S130, after the impact mechanism applies the impact force to the output shaft for a preset time, whether the fastener is in the tightened state is determined according to the load parameter of the output shaft.

When the impact wrench 100 is in the loaded state, the fastener is still in the tightened state, so the output torque of the impact wrench 100 cannot loosen the fastener at this time.

In S140, in the case where it is determined that the fastener is in the tightened state according to the load parameter of the output shaft, the motor shaft 121 is controlled to rotate at the second speed, where the second speed is greater than the first speed.

The controller 17 controls the electric motor 12 to enter an extreme speed working state, thereby further increasing the rotational speed to increase the output torque.

Figure 8:
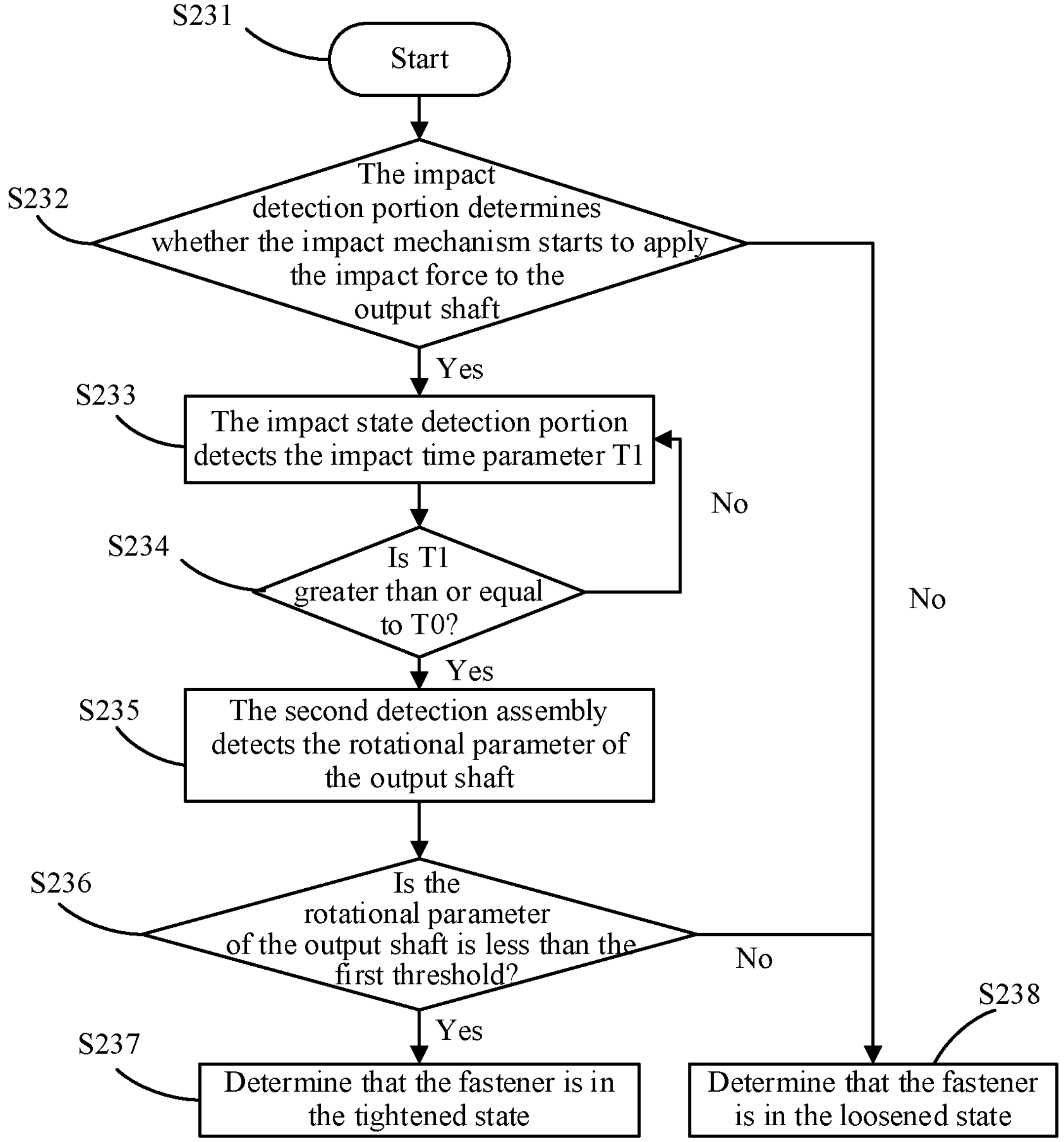
FIG. 8 is a flowchart of a method for activating an extreme speed working mode of an impact tool in a control method for an impact tool according to an example of the present application.

According to the flowchart of the control method for the impact wrench 100 shown in FIG. 8, a method for activating the extreme speed working mode of the impact wrench 100 includes the specific steps described below.

In S231, the process starts.

In S232, the impact detection portion determines whether the impact mechanism starts to apply the impact force to the output shaft. If so, S233 is performed. If not, S238 is performed.

In S233, the impact state detection portion detects the impact time parameter T1.

In S234, whether T1 is greater than or equal to T0 is determined. If so, S235 is performed. If not, S233 is performed.

In S235, the second detection assembly detects the rotational parameter of the output shaft.

In S236, whether the rotational parameter of the output shaft is less than the first threshold is determined. If so, S237 is performed. If not, S238 is performed.

In S237, it is determined that the fastener is in the tightened state.

In S238, it is determined that the fastener is in the loosened state.

Figure 9:
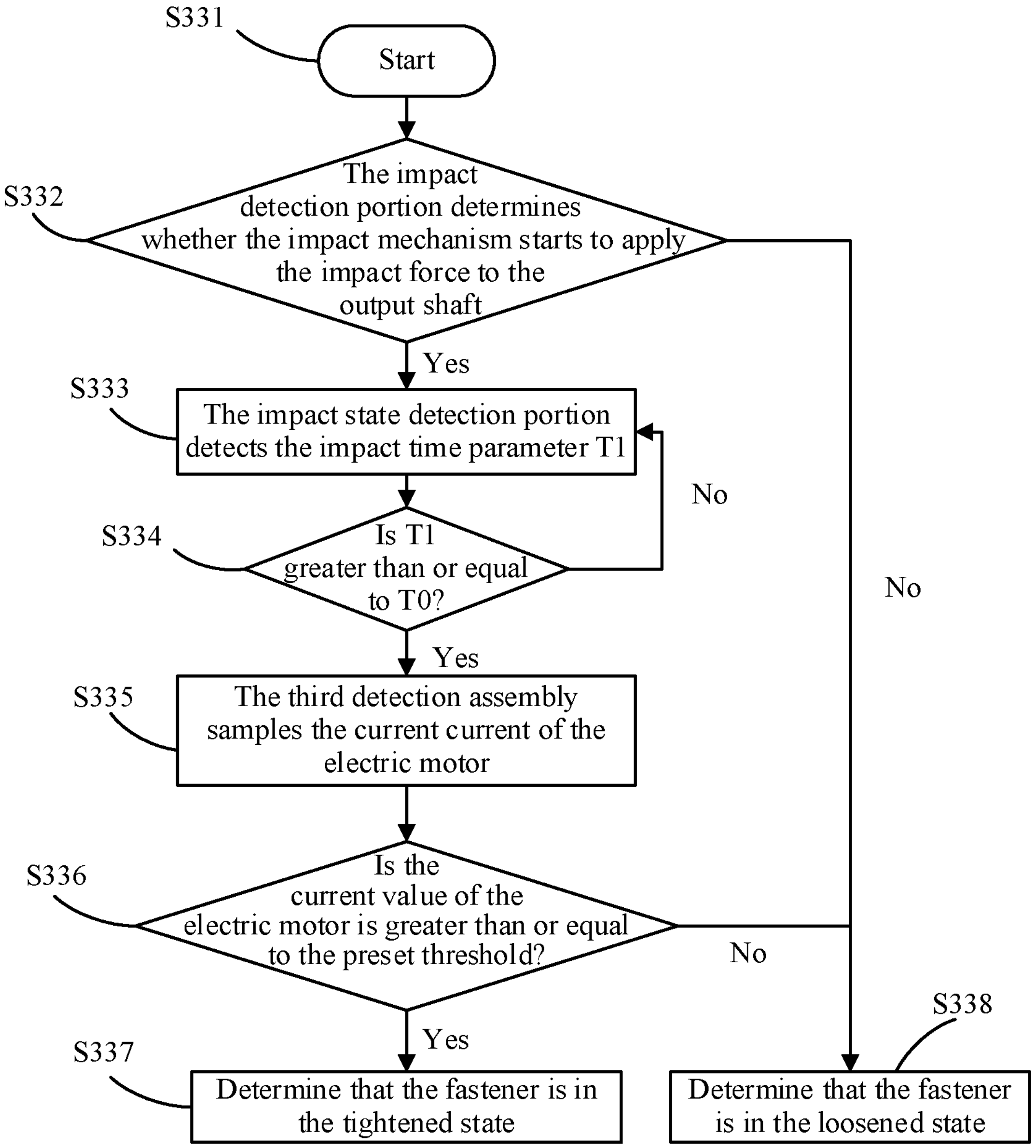
FIG. 9 is a flowchart of another method for activating an extreme speed working mode of an impact tool in a control method for an impact tool according to an example of the present application.

According to the flowchart of the control method for the impact wrench 100 shown in FIG. 9, another method for activating the extreme speed working mode of the impact wrench 100 includes the specific steps described below.

In S331, the process starts.

In S332, the impact detection portion determines whether the impact mechanism starts to apply the impact force to the output shaft. If so, S333 is performed. If not, S338 is performed.

In S333, the impact state detection portion detects the impact time parameter T1.

In S334, whether T1 is greater than or equal to T0 is determined. If so, S335 is performed. If not, S333 is performed.

In S335, the third detection assembly samples the current current of the electric motor.

In S336, whether the current value of the electric motor is greater than or equal to the preset threshold is determined. If so, S337 is performed. If not, S338 is performed.

In S337, it is determined that the fastener is in the tightened state.

In S338, it is determined that the fastener is in the loosened state.

It is to be understood that the third detection assembly may also detect the rotational speed, the freewheeling time, and the commutation parameter of the electric motor to determine the load condition of the output shaft.

In some examples, switching between two working states can be achieved through operating elements. For example, a handheld tool with a Boost (extremely fast switching) key can switch between the extreme speed working mode and the normal working mode of the tool through the Boost key. The operating elements are buttons. The operating elements may also be other types of elements that can be triggered by the user, such as triggers and knobs. In some examples, switching may also be performed through a user interface, where the user interface may include one or more of an indicator, a display, and a touch screen. In some examples, switching may be performed through an external input portion, where the external input portion includes a smartphone, a tablet computer, a laptop, and a smart wearable device, and switching is controlled through Bluetooth, a wireless local area network (WLAN), and wireless transmission.

In some examples, the impact wrench 100 can enter the extreme speed working mode through user operation or automatic recognition.

In some examples, the extreme speed working mode includes multiple speeds to choose from. Specifically, the extreme speed working mode includes the second speed and the third speed. The third speed is greater than the second speed. The second speed is greater than the first speed. In this manner, the working conditions and environment of the impact wrench 100 are expanded.

FIGS. 10 to 14 show another example of the present application. When the direction of rotation of the electric motor 12 is set to the reverse rotation direction, the controller 17 controls the electric motor 12 to start with a first duty cycle signal. It is determined that the fastener is in the tightened state according to the load parameter of the output shaft 131, and the controller 17 adjusts the electric motor 12 such that the electric motor 12 operates with a second duty cycle signal, where a first duty cycle is less than a second duty cycle. It is to be explained that when the load parameter of the output shaft 131 is detected, the impact wrench 100 is in a start-up completed state. That is to say, when the electric motor 12 tends to operate stably, the load parameter of the output shaft 131 is detected.

In this example, the starting state control of the electric motor 12 is performed when the direction of rotation of the electric motor 12 is set to the reverse rotation direction. When the direction of rotation of the electric motor 12 is set to reverse rotation, the user inputs an operation instruction for starting the electric motor 12, and at this time, the duty cycle signal is limited to the first duty cycle. When the electric motor 12 tends to operate stably, the load parameter of the output shaft 131 is detected. After it is determined that the fastener is in the tightened state, the duty cycle of the electric motor 12 is improved such that the electric motor 12 operates with the second duty cycle signal.

The controller 17 controls the electric motor 12 to start with the first duty cycle signal. The controller 17 controls the electric motor 12 by using a brushless direct current electric motor (BLDC) square wave. Since the first duty cycle signal is less than the second duty cycle signal, at this time, the rotational speed of the electric motor 12 is relatively small and the output torque of the output shaft 131 of the impact wrench 100 is relatively small. The controller 17 determines whether the fastener is in the tightened state according to the load parameter of the output shaft 131. The load parameter of the output shaft 131 is compared with a preset parameter threshold. If the load parameter satisfies the preset parameter threshold, it is determined that the fastener is in the tightened state. When it is determined that the fastener is in the tightened state, the controller 17 adjusts the electric motor 12 such that the electric motor 12 operates with the second duty cycle signal. Under the second duty cycle, the rotational speed of the electric motor 12 is relatively large, that is to say, the output torque is relatively large. The relatively large second duty cycle signal drives the output shaft 131 to output torque to loosen the fastener.

In this example, the second duty cycle signal is configured to be a duty cycle signal satisfying that the electric motor 12 drives the output shaft 131 such that the output shaft 131 can loosen the fastener in the tightened state. The "tightened state" here is the tightened state of the fastener to which standard torque is applied, excluding the working condition when the fastener is rusted or deformed.

If the load parameter does not satisfy the preset parameter threshold, it is determined that the fastener is in the loosened state. The controller 17 controls the motor to keep operating with the first duty cycle signal. In this example, the first duty cycle signal is configured to be a duty cycle signal satisfying that the electric motor 12 drives the output shaft 131 such that the output shaft 131 can loosen the fastener in the loosened state. However, the output torque of the output shaft 131 of the impact wrench 100 operating with the first duty cycle signal is not enough to loosen the fastener in the tightened state.

In the related art, the impact wrench 100 is provided with a reverse rotation deceleration or reverse rotation self-stop function for preventing the fastener from being completely loosened and falling off. That is, it is determined that the fastener is in the loosened state according to the load parameter of the output shaft, and the controller 17 limits the torque output of the electric motor 12.

However, when the fastener is initially in a non-tightened state (that is, the fastener is in the loosened state), the impact wrench 100 frequently stops or decelerates due to the reverse rotation self-stop or reverse rotation deceleration function. However, it is very dangerous if the reverse rotation deceleration or reverse rotation self-stop is canceled. At the same time, it is very dangerous if the fastener in the non-tightened state is still operated at high speed in the related art.

Therefore, in this example, when the impact wrench 100 starts in reverse rotation, the duty cycle signal is limited to a relatively small value so that even if the fastener is initially in the non-tightened state, the impact wrench 100 is maintained at a safe disassembly speed. Moreover, the tightened state of the fastener is determined according to the load of the output shaft 131. When it is determined that the fastener is in the tightened state, the controller 17 automatically sends a signal with an increased duty cycle and then the electric motor 12 is controlled to operate with an increased duty cycle, that is, the impact wrench 100 enters the normal reverse rotation working mode (hereinafter referred to as the normal working mode) at this time. Through the technical solution provided in this example, the impact wrench 100 can safely disassemble the fastener initially in the non-tightened state, thereby expanding the working conditions of the user. The impact wrench 100 starts and operates with a small duty cycle and automatically increases the duty cycle after detecting that the fastener is in the tightened state. That is, after detecting that the fastener is in the tightened state, the impact wrench 100 automatically increases the rotational speed to loosen the fastener so that the working efficiency of the impact wrench 100 is not affected. In this manner, the problem of poor user experience when the fastener is disassembled in the related art is solved.

On the other hand, the electric motor 12 starts with a relatively small first duty cycle signal, and in the case where it is determined that the fastener is in the tightened state, the electric motor 12 is automatically adjusted such that the electric motor 12 operates with a relatively large second duty cycle signal. Compared with the related art, the technical solution of starting the electric motor 12 at full speed can save power consumption.

In terms of improving the feel of use, the change of the duty cycle signal from small to large during operation is reflected in the rotational speed of the impact wrench 100. The rotational speed of the motor gradually changes from small to large, and the degree of change in rotational speed is small, thereby improving the operator's feel.

In this example, under the second duty cycle signal, the motor shaft 121 of the electric motor 12 can operate at full speed. The "full speed operation" here refers to the corresponding speed of the motor shaft 121 of the electric motor 12 when the trigger stroke of the speed regulation portion 161 is adjusted to the limit.

In this example, the first duty cycle is less than the second duty cycle. In some examples, the first duty cycle is 80% of the second duty cycle. In some examples, the first duty cycle is 70% of the second duty cycle. In some examples, the first duty cycle is 60% of the second duty cycle. In some examples, the first duty cycle is 50% of the second duty cycle. In some examples, the first duty cycle is 40% of the second duty cycle. In some examples, the first duty cycle is 30% of the second duty cycle. Specifically, the first duty cycle signal and the second duty cycle signal in the example of the present application are not limited, can be set by those skilled in the art as required, and do not affect the essence of the present application.

After the controller 17 controls the electric motor 12 to operate with a relatively small first duty cycle, the state of the fastener needs to be determined according to the load parameter of the output shaft 131. For example, the load parameter of the output shaft 131 is compared with the preset parameter threshold. If the load parameter satisfies the preset parameter threshold, it is determined that the fastener is in the tightened state. If the load parameter does not satisfy the preset parameter threshold, it is determined that the fastener is in the loosened state. In the case where it is determined that the fastener is in the loosened state, the controller 17 controls the electric motor 12 to continue operating with a relatively small first duty cycle signal.

In this example, in the case where it is determined that the fastener is in the tightened state, the electric motor 12 is adjusted such that the electric motor 12 operates with a relatively large second duty cycle signal. In the case where it is determined that the fastener is in the loosened state, the controller 17 continues controlling the electric motor 12 to keep operating with a relatively small first duty cycle signal. According to the loosened state of the fastener, different control manners are adopted so that when the fastener is in the loosened state, the fastener may be removed through a relatively small first duty cycle signal, thereby preventing the fastener from being completely loosened and falling off.

The controller is further configured to, when it is determined that the load of the output shaft is less than or equal to the preset load according to the load parameter of the output shaft 131 and the controller 17 controls the electric motor 12 to operate with the first duty cycle signal, limit the torque output of the electric motor 12 according to the operation instruction of the user received by the speed regulation portion 161.

When it is determined that the load of the output shaft is less than or equal to the preset load, that is, the fastener is in the loosened state, by comparing the load parameter of the output shaft 131 with the preset parameter threshold, the controller 17 controls the electric motor 12 to operate with a relatively small first duty cycle signal. The operator limits the torque output of the electric motor 12 through the speed regulation portion 161 disposed on the grip 113. When it is determined that the fastener is in the loosened state, the operator determines whether to limit the torque output of the electric motor 12. When the fastener is completely removed, the operator controls the electric motor 12 to stop through the trigger switch. The fastener can be removed in one go while the fastener is in the loosened state. Compared with the reverse rotation self-stop or reverse rotation deceleration function in the reverse rotation mode in the related art, since in the present application, when the fastener is in the loosened state, the duty cycle of the motor is relatively low, that is, the rotational speed is not high, at this time, canceling the reverse self-stop or reverse deceleration does not cause danger. In this manner, the operator can control the speed and stop the motor by himself, making the operation process simple and improving the use experience of the operator.

It is to be noted that the limiting of the torque output of the electric motor 12 mentioned above may be controlling the electric motor 12 to stop completely or controlling the electric motor 12 to rotate at a very low speed without stopping completely, which is not limited in the example of the present application.

Figure 10:
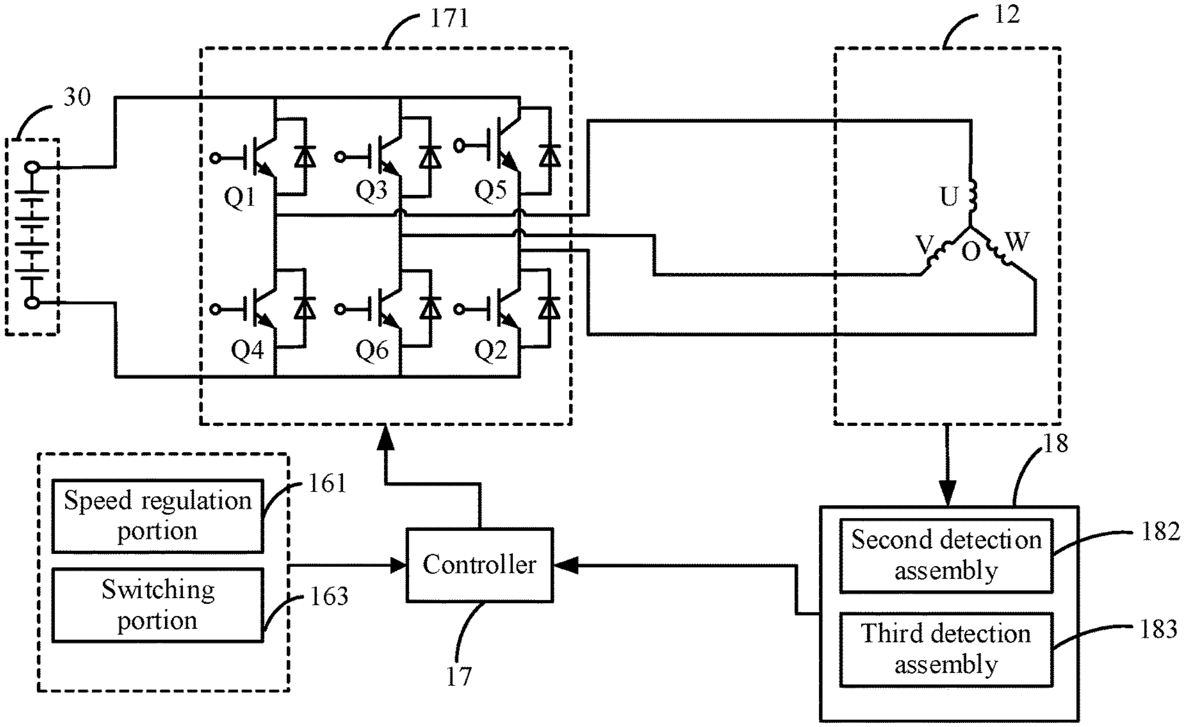
FIG. 10 is a circuit block diagram according to a second example of the present application.
Figure 11:
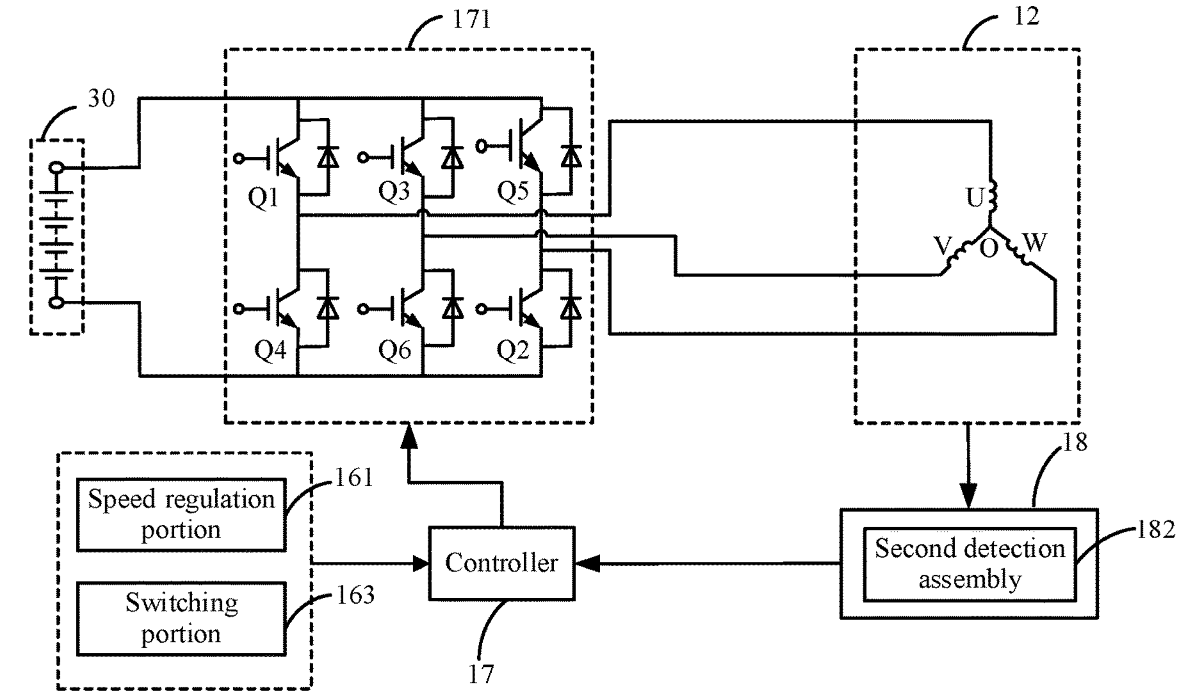
FIG. 11 is another circuit block diagram according to a second example of the present application.
Figure 12:
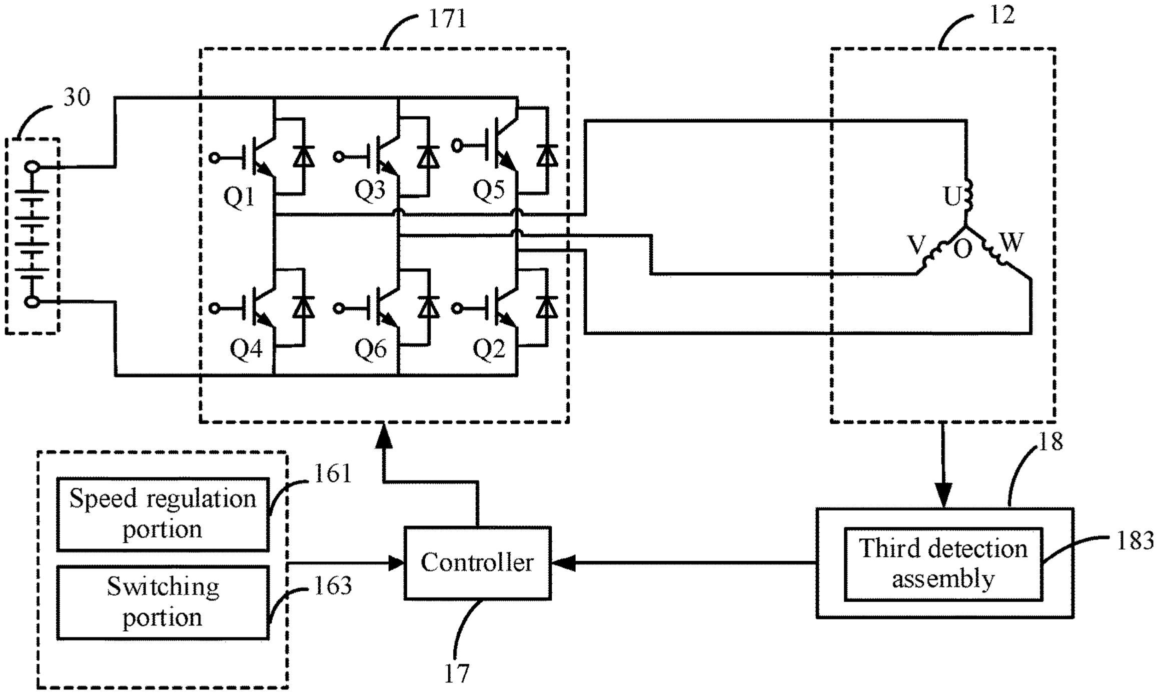
FIG. 12 is a third circuit block diagram according to a second example of the present application.

Referring to FIGS. 10 to 12, the impact wrench 100 further includes the detection mechanism 18 for detecting the load parameter of the output shaft 131. The detection mechanism 18 includes the second detection assembly 182 for detecting a first load parameter of the output shaft 131. The first load parameter includes the rotational parameter of the output shaft 131. The first load parameter includes at least one of the rotational speed of the output shaft 131, the angle of rotation of the output shaft 131, and the rotational acceleration of the output shaft 131. The tightness of the fastener by the impact wrench 100 is determined by the rotational parameter. For example, the second detection assembly 182 includes a position sensor, which may specifically be a photodiode sensor, a magnetic sensor, or a potentiometer. The second detection assembly 182 may also be a rotation sensor, which may specifically be a gyroscope sensor. The gyroscope sensor may be a single-axis, two-axis, or three-axis MEMS sensor or a rotation sensor so that the second detection assembly 182 detects at least one of the rotational speed of the output shaft 131, the angle of rotation of the output shaft 131, and the rotational acceleration of the output shaft 131.

It is to be noted that when the first load parameter is the rotational speed of the output shaft 131, the first threshold corresponding to the rotational speed of the output shaft 131 may be preset in the controller 17, where the first threshold is the rotational speed of the load-free or light-load output shaft 131. When the rotational speed of the output shaft 131 is less than the first threshold, it is determined that the fastener is in the tightened state. When the rotational speed of the output shaft 131 is greater than or equal to the first threshold, it is determined that the fastener is in the loosened state.

In some examples, the detection mechanism 18 includes the third detection assembly 183 for detecting a second load parameter of the output shaft 131. The second load parameter includes at least one of the rotational speed of the electric motor 12, the current of the electric motor 12, and the freewheeling time.

The third detection assembly 183 is used for detecting the second load parameter of the output shaft 131. The second load parameter may be represented according to the electrical parameter of the electric motor 12 and includes at least one of the rotational speed of the electric motor 12, the current of the electric motor 12, and the freewheeling time. The third detection assembly 183 may be a current sense resistor, a Hall current sensor, or MOSFET on-resistance.

It is to be noted that when the second load parameter is the current of the electric motor 12, the second threshold corresponding to the current of the electric motor 12 may be preset in the controller 17. The second threshold is the current of the load-free or light-load electric motor 12 and may also be another calculated value that can reflect the current value when the electric motor 12 is load-free or light-load. When the current of the electric motor 12 is greater than the second threshold, it is determined that the fastener is in the tightened state. When the current of the electric motor 12 is less than the second threshold, it is determined that the fastener is in the loosened state.

It is to be noted that, in some examples, two or more current values of the electric motor 12 are sampled continuously. The current value of the electric motor 12 is compared with the previous adjacent current value. The comparison result of the current value and the previous adjacent current value is compared with a third threshold. The third threshold is the difference between adjacent current values in the stage t2. In the loaded state, since the current is in the stable fluctuation state, the difference in current value is a relatively constant value.

As shown in FIGS. 11 and 12, only one of the second detection assembly 182 and the third detection assembly 183 may be provided according to actual product requirements. In some examples, as shown in FIG. 10, the second detection assembly 182 and the third detection assembly 183 are provided at the same time. The preceding setting method is not limited in this example.

Some of the preceding detection assemblies may be used individually, or a combination of several technical solutions may be used.

The controller 17 is further configured as follows: after the controller 17 adjusts the electric motor 12 such that the electric motor 12 operates with the second duty cycle signal, it is determined whether the fastener is in the loosened state according to the load parameter of the output shaft 131, and the controller limits the torque output of the electric motor 12 in the case where it is determined that the fastener is in the loosened state according to the change in load parameter.

Optionally, after it is determined that the fastener is in the tightened state and the electric motor 12 is adjusted such that the electric motor 12 operates with the second duty cycle signal, whether the fastener is in the loosened state is determined according to the change in load parameter of the output shaft 131. When the change in load parameter of the output shaft 131 is greater than a set threshold, the fastener is in the loosened state. At this time, the controller 17 limits the torque output of the electric motor 12, including cutting off the power supply of the electric motor 12 to stop the electric motor 12. Alternatively, the electric motor 12 is controlled to rotate at a lower speed. When the change in load parameter of the output shaft 131 is less than the set threshold, the fastener is in the tightened state, the electric motor 12 needs to continue to be controlled to operate with the second duty cycle signal until the change in load parameter of the output shaft 131 is detected to be greater than the set threshold, and the torque output of the electric motor 12 is limited. In this manner, when the initial state of the fastener is the tightened state, the reverse rotation self-stop mode and the reverse rotation deceleration mode are set so that the impact wrench 100 does not have the problem of the fastener falling off during the process of loosening the fastener, thereby improving operational safety.

Figure 13:
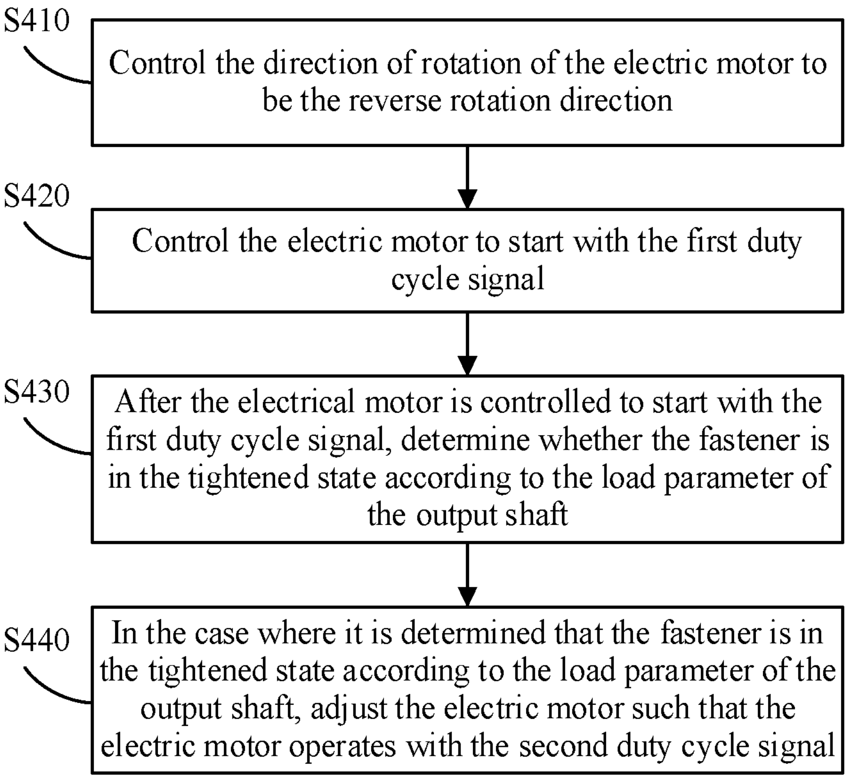
FIG. 13 is a flowchart of a control method for an impact tool according to an example of the present application.

This example further provides the control method for the impact wrench 100. FIG. 13 is a flowchart of the control method for the impact wrench 100 according to an example of the present application. The control method includes the steps described below.

In S410, the direction of rotation of the electric motor is controlled to be the reverse rotation direction according to the setting of an operation switching portion.

Optionally, when the switching portion 163 sets the direction of rotation of the electric motor 12 to the reverse rotation direction, the controller 17 responds to the trigger signal of the switching portion 163 and controls the driver circuit 171 to output a drive signal for causing the direction of rotation of the electric motor 12 to be the reverse rotation direction, so as to control the electric motor 12 to rotate and operate in reverse.

In S420, the electric motor is controlled to start with the first duty cycle signal.

After the switching portion 163 sets the direction of rotation of the electric motor 12 to the reverse rotation direction, the controller 17 controls the driver circuit 171 to output the first duty cycle signal. The first duty cycle signal may be understood as follows: under the first duty cycle signal, the rotational speed of the electric motor 12 is large enough to loosen the fastener in the loosened state so that after the switching portion 163 sets the direction of rotation of the electric motor 12 to the reverse rotation direction, the electric motor 12 is controlled to start with a relatively small first duty cycle signal, thereby ensuring safety.

In S430, after the electrical motor is controlled to start with the first duty cycle signal, whether the fastener is in the tightened state is determined according to the load parameter of the output shaft.

After the electric motor 12 is controlled to start with the first duty cycle signal, the load parameter of the output shaft 131 is acquired, and the load parameter of the output shaft 131 is compared with the preset parameter threshold preset by the controller 17. If the load parameter satisfies the preset parameter threshold, it is determined that the fastener is in the tightened state. If the load parameter does not satisfy the preset parameter threshold, it is determined that the fastener is in the loosened state.

In S440, in the case where it is determined that the fastener is in the tightened state according to the load parameter of the output shaft, the electric motor is adjusted such that the electric motor operates with the second duty cycle signal, where the second duty cycle is greater than the first duty cycle.

The fastener in the tightened state cannot be loosened with the first duty cycle signal outputted by the driver circuit 171 so that in the case where it is determined that the fastener is in the tightened state according to the load parameter of the output shaft 131, the controller 17 controls the driver circuit 171 to output the second duty cycle signal to control the electric motor 12 to operate at a larger speed during reverse operation. The second duty cycle signal may be understood as follows: under the second duty cycle signal, the rotational speed of the electric motor 12 is large enough to loosen the fastener in the tightened state. During operation, the rotational speed of the electric motor 12 gradually changes from small to large, thereby improving the operator's feel.

Figure 14:
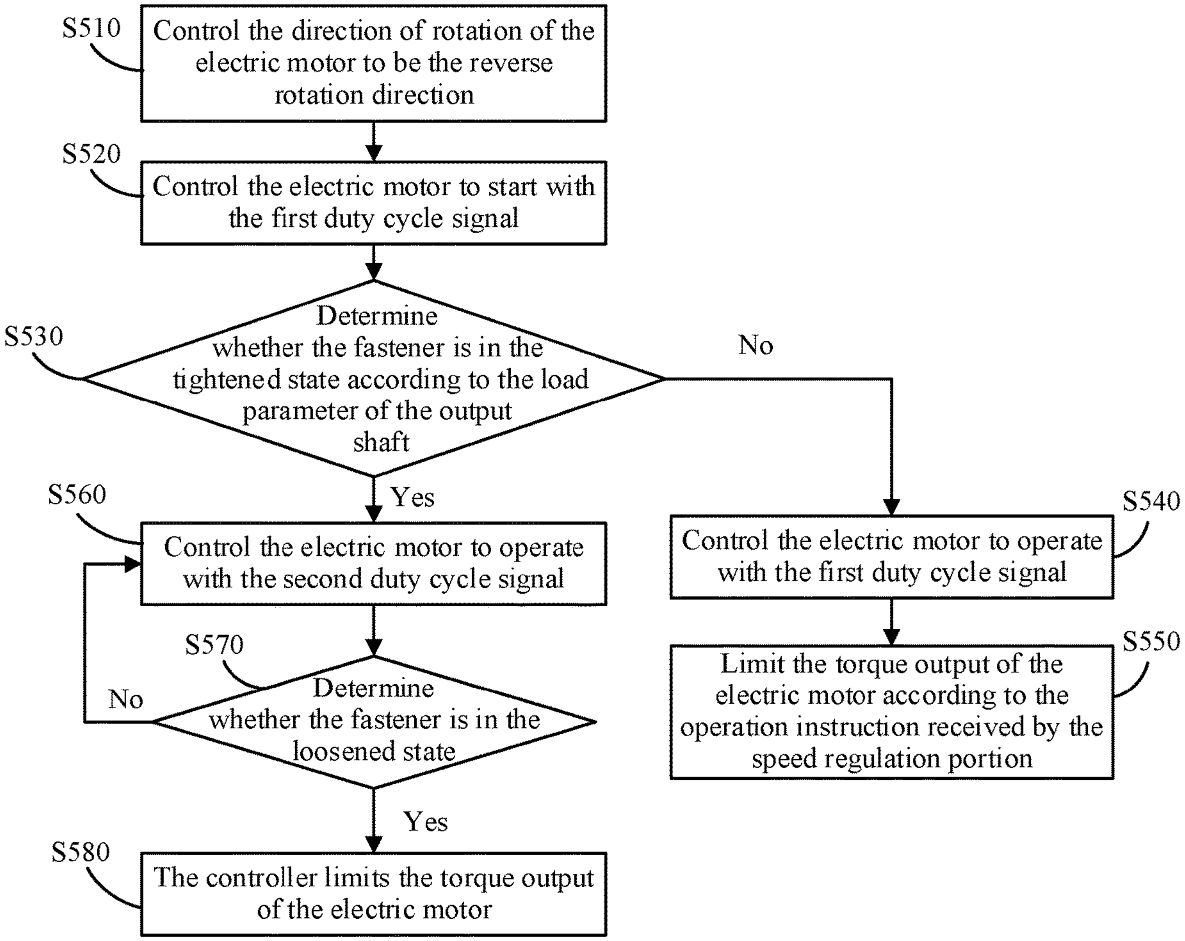
FIG. 14 is a flowchart of another control method for an impact tool according to an example of the present application.

FIG. 14 is a flowchart of another control method for the impact wrench 100 according to an example of the present application. The control method includes the steps described below.

In S510, the direction of rotation of the electric motor is controlled to be the reverse rotation direction according to the setting of an operation switching portion.

In S520, the electric motor is controlled to start with the first duty cycle signal.

In S530, after the electrical motor is controlled to start with the first duty cycle signal, whether the fastener is in the tightened state is determined according to the load parameter of the output shaft. If not, S540 is performed. In so, S560 is performed.

In S540, in the case where it is determined that the fastener is in the loosened state according to the load parameter of the output shaft, the motor is controlled to operate with the first duty cycle signal.

The fastener in the loosened state can be loosened with the first duty cycle signal outputted by the driver circuit 171 so that in the case where it is determined that the fastener is in the loosened state according to the load parameter of the output shaft 131, the controller 17 continues controlling the electric motor 12 to operate with the first duty cycle signal, thereby completely removing the fastener through a relatively small first duty cycle signal.

In S550, the torque output of the electric motor 12 is limited according to the operation instruction received by the speed regulation portion 161.

That is, when it is determined that the fastener is in the loosened state, whether to limit the torque output of the electric motor 12 is determined according to the operation instruction of the operator. When the fastener is completely removed, the operator can control the electric motor 12 to stop through the speed regulation portion 161. In this manner, when the fastener is in the loosened state, the fastener can be completely removed at one time so that the operation process is simple and the use experience of the operator is improved.

In S560, in the case where it is determined that the fastener is in the tightened state according to the load parameter of the output shaft, the motor is adjusted such that the motor operates with the second duty cycle signal.

In S570, whether the fastener is in the loosened state is determined according to the load parameter of the output shaft; or whether the fastener is in the loosened state is determined according to the change in load parameter. In so, S580 is performed. If not, S560 is performed.

In S580, the controller limits the torque output of the electric motor.

After it is determined that the fastener is in the tightened state and the electric motor 12 is adjusted such that the electric motor 12 operates with the second duty cycle signal, whether the fastener is in the loosened state is determined according to the change in load parameter of the output shaft 131. When the change in load parameter of the output shaft 131 is greater than the set threshold, the fastener is in the loosened state. At this time, the controller 17 limits the torque output of the electric motor 12, including cutting off the power supply of the electric motor 12 to stop the electric motor 12 or controlling the electric motor 12 to rotate at a very low speed. When the change in load parameter of the output shaft 131 is less than the set threshold, the fastener is in the tightened state, the electric motor 12 needs to continue to be controlled to operate with the second duty cycle signal until the change in load parameter of the output shaft 131 is detected to be greater than the set threshold, and the torque output of the electric motor 12 is limited.

It is to be noted that limiting the torque output of the electric motor 12 may be controlling the electric motor 12 to completely stop or controlling the electric motor 12 to rotate at a low speed but not to completely stop the electric motor 12.

Figure 15:
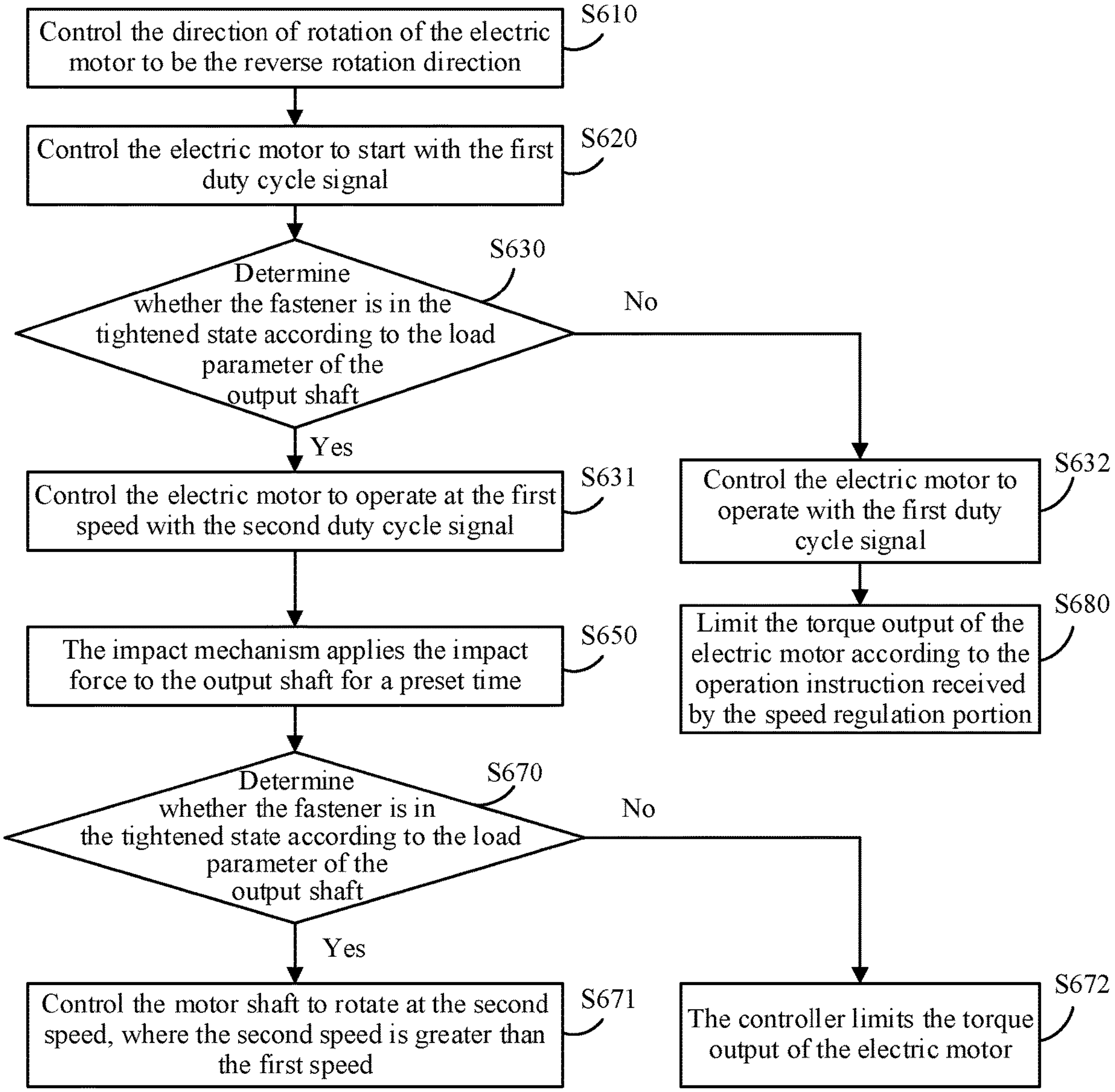
FIG. 15 is a flowchart of a control method for an impact tool according to a third example of the present application.

FIG. 15 shows the third example of the present application. The controller 17 of the impact wrench 100 is configured to control the electric motor 12 to start with the first duty cycle signal when the direction of rotation of the electric motor 12 is set to the reverse rotation direction. It is determined that the fastener is in the tightened state according to the load parameter of the output shaft 131, the controller 17 adjusts the electric motor 12 such that the electric motor 12 operates with the second duty cycle signal, and the motor shaft 121 rotates at the first speed, where the first duty cycle signal is less than the second duty cycle signal. After the impact mechanism 15 applies the impact force to the output shaft 131 for a preset time, according to the load parameter of the output shaft 131, it is determined that the fastener is still in the tightened state, and the controller 17 controls the drive shaft to rotate at the second speed, where the second speed is greater than the first speed.

In this example, when the switching portion 163 is configured to set the direction of rotation of the electric motor 12 to the reverse rotation direction in which the fastener is loosened, the controller 17 controls the electric motor 12 to start with the first duty cycle signal. Whether the fastener is in the tightened state is determined according to the load parameter of the output shaft 131. The load parameter of the output shaft 131 is compared with a preset parameter threshold. If the load parameter satisfies the preset parameter threshold, it is determined that the fastener is in the tightened state. If the load parameter does not satisfy the preset parameter threshold, it is determined that the fastener is in the loosened state. When it is determined that the fastener is in the tightened state, the controller 17 adjusts the electric motor 12 such that the electric motor 12 operates with the second duty cycle signal. The second duty cycle is greater than the first duty cycle, so under the first duty cycle signal, the rotational speed of the electric motor 12 is small. In this example, the output torque is not enough to loosen the fastener in the tightened state. Under the second duty cycle signal, the rotational speed of the electric motor 12 is large, so the output torque of the impact wrench 100 is large, and the output shaft is driven through a relatively large second duty cycle signal to output torque to loosen the fastener. When the electric motor 12 operates with the second duty cycle signal, the motor shaft 121 rotates at the first speed. Optionally, to ensure the disassembly efficiency of the impact wrench 100, the first speed is the rotational speed of the electric motor 12 when the trigger stroke of the speed regulation portion 161 is adjusted to the limit.

In some special cases, for example, when the fastener to be disassembled is rusted or deformed, under the second duty cycle signal, the output torque of the output shaft is not enough to loosen the rusted or deformed fastener in the tightened state. Therefore, after the impact mechanism 15 applies the impact force to the output shaft 131 for a preset time, whether the fastener is in the tightened state is determined again according to the load parameter of the output shaft after the preset time. In this example, the load parameter of the output shaft at this time is defined as a third load parameter. If after the preset time, the third load parameter is compared with the preset parameter threshold and it is determined that the fastener is still in the tightened state, then it can be considered that the fastener is rusted or deformed. In this case, the motor shaft 121 needs to be controlled to rotate at the second speed greater than the first speed, and the impact frequency is increased by increasing the rotational speed of the electric motor 12 so that the output torque of the impact wrench 100 is further increased, thereby loosening the rusted or deformed fastener.

Optionally, the first duty cycle signal is configured to be a duty cycle signal satisfying that the electric motor 12 drives the output shaft 131 such that the output shaft 131 can loosen the fastener in the loosened state. The second duty cycle signal is configured to be a duty cycle signal satisfying that the electric motor 12 drives the output shaft 131 such that the output shaft 131 can loosen the fastener in the tightened state.

In the example of the present application, under the second duty cycle signal, the electric motor 12 can operate at full speed, that is to say, the first speed is the speed corresponding to the motor shaft 121 of the electric motor 12 when the speed regulation portion 161 is triggered to the maximum trigger stroke. Specifically, the first duty cycle signal and the second duty cycle signal in the example of the present application are not limited, can be set by those skilled in the art as required, and do not affect the essence of the present application. The second speed is greater than the maximum speed that the speed regulation portion 161 can adjust. Under special working conditions, the ability to exceed the rated output of the impact wrench 100 is provided.

In this example, the switching portion 163 is configured such that when the direction of rotation of the electric motor 12 is set to the reverse rotation direction, the electric motor 12 starts with a relatively small first duty cycle signal, and in the case where it is determined that the fastener is in the tightened state, the electric motor 12 is adjusted such that the electric motor 12 operates with a relatively large second duty cycle signal. Under special working conditions, if the fastener is rusted or deformed, the electric motor 12 may be adjusted to output at a higher speed. The impact frequency is increased by increasing the rotational speed of the electric motor 12 so that the output torque is further increased, thereby loosening the rusted or deformed fastener in the tightened state. In this manner, different control manners are adopted according to different situations, thereby greatly improving the use experience of the operator.

The example of the present application further provides the control method for the impact wrench 100, which is applied to the preceding impact wrench 100. FIG. 15 is a flowchart of the control method for the impact wrench 100 according to an example of the present application. The control method includes the steps described below.

In S610, the direction of rotation of the electric motor is controlled to be the reverse rotation direction according to the setting of an operation switching portion.

In S620, the electric motor is controlled to start with the first duty cycle signal.

In S630, whether the fastener is in the tightened state is determined according to the load parameter of the output shaft 131. If so, S631 is performed. If not, S632 is performed.

When the electric motor 12 tends to operate stably, the load parameter of the output shaft 131 is detected to determine whether the fastener is in the tightened state.

In S631, in the case where it is determined that the fastener is in the tightened state according to the load parameter of the output shaft, the electric motor is adjusted such that the electric motor operates at the first speed with the second duty cycle signal.

In S650, the impact mechanism applies the impact force to the output shaft for a preset time.

In S670, whether the fastener is in the tightened state is determined according to the load parameter of the output shaft. If so, S671 is performed. If not, S672 is performed.

Therefore, after the impact mechanism 15 applies the impact force to the output shaft 131 for a preset time, whether the fastener is in the tightened state is determined again according to the load parameter, that is, the third load parameter, of the output shaft 131 after the preset time. If after the preset time, the third load parameter is compared with the preset parameter and it is determined that the fastener is still in the tightened state, then it can be considered that the fastener is rusted or deformed. In this case, the rotational speed of the motor under the second duty cycle signal is not large enough to loosen the fastener.

In S671, the motor shaft is controlled to rotate at the second speed, where the second speed is greater than the first speed.

In the case where it is determined that the fastener is in the tightened state according to the third load parameter of the output shaft, it is considered that the fastener may be rusted or deformed, and then the controller 17 adjusts the electric motor 12 such that the electric motor 12 operates at a higher speed, that is, the second speed. The impact frequency is increased by increasing the rotational speed of the electric motor 12 so that the output torque is further increased, thereby loosening the rusted or deformed fastener.

In S672, the controller limits the torque output of the motor.

In the case where it is determined that the fastener is in the loosened state according to the third load parameter of the output shaft 131, the controller limits the torque output of the electric motor 12, thereby preventing the fastener from falling off and ensuring safety.

In S632, in the case where it is determined that the fastener is in the loosened state according to the load parameter of the output shaft, the motor is controlled to operate with the first duty cycle signal.

The fastener in the loosened state can be loosened with the first duty cycle signal outputted by the driver circuit 171 so that in the case where it is determined that the fastener is in the loosened state according to the load parameter of the output shaft 131, the controller 17 continues controlling the electric motor 12 to operate with the first duty cycle signal, thereby completely removing the fastener through a relatively small first duty cycle signal.

In S680, the torque output of the electric motor 12 is limited according to the operation instruction received by the speed regulation portion 161.

That is, when it is determined that the fastener is in the loosened state, whether to limit the torque output of the electric motor 12 is determined according to the operation instruction of the operator. When the fastener is completely removed, the operator can control the electric motor 12 to stop through the speed regulation portion 161. In this manner, when the fastener is in the loosened state, the fastener can be completely removed at one time so that the operation process is simple and the use experience of the operator is improved.

To sum up, in the example of the present application, the switching portion is configured such that when the direction of rotation of the electric motor 12 is set to the reverse rotation direction, the electric motor 12 starts with a relatively small first duty cycle signal, and in the case where it is determined that the fastener is in the tightened state, the electric motor 12 is adjusted such that the electric motor 12 operates with a relatively large second duty cycle signal. On the one hand, compared with the technical solution of starting the electric motor 12 at full speed in the related art, power consumption can be saved; on the other hand, the gradual change of the duty cycle signal from small to large during operation is reflected by the gradual change of the rotational speed of the electric motor from small to large, the degree of change in rotational speed is small, and the operator's feel is improved. In addition, under special working conditions, for example, when the fastener is rusted or deformed, the controller 17 controls the electric motor 12 to enter the extreme speed working state, and the impact frequency is increased by increasing the rotational speed of the electric motor 12 so that the output torque is further increased, thereby loosening the rusted or deformed fastener in the tightened state. In this manner, different control manners are adopted according to different situations, thereby greatly improving the use experience of the operator.

Figure 16:
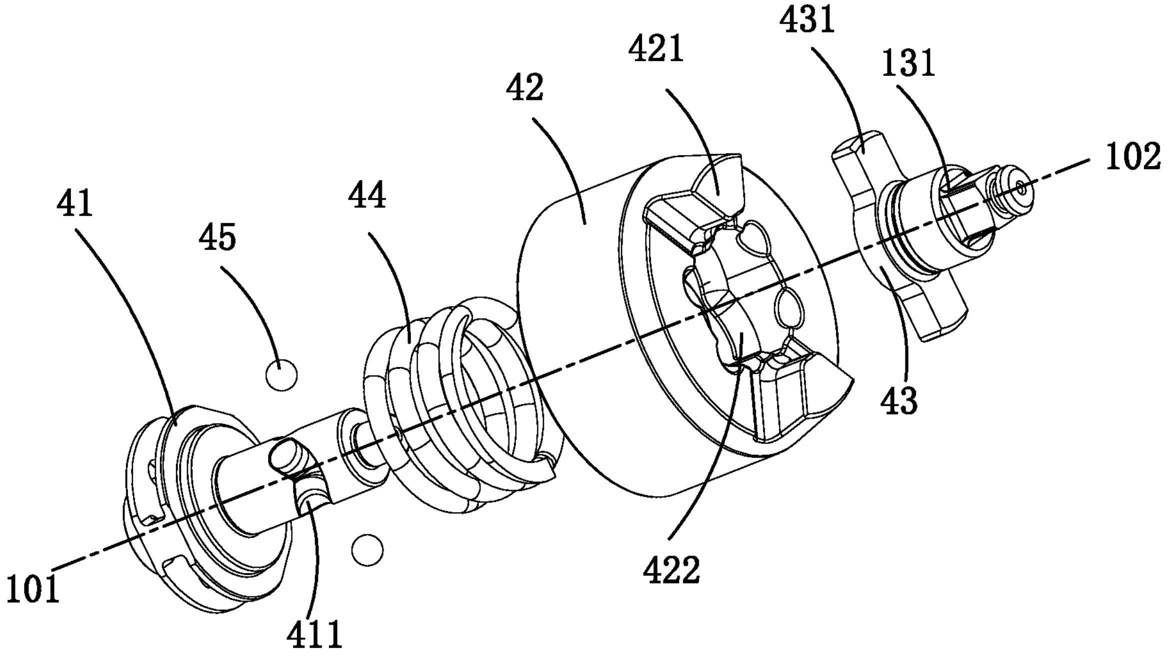
FIG. 16 is an exploded view of an impact mechanism and an output shaft involved in a fourth example.
Figure 17:
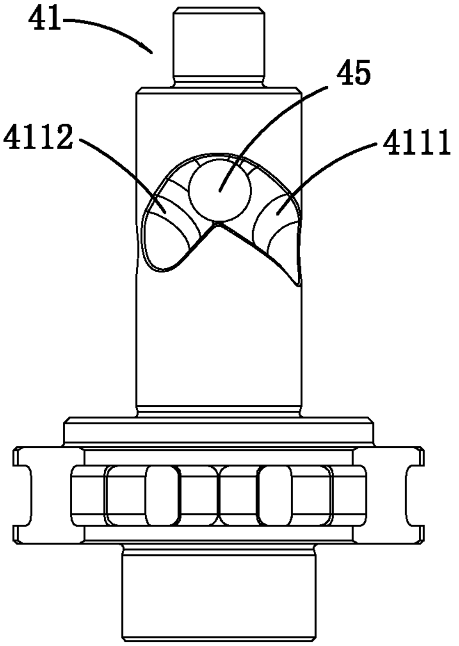
FIG. 17 is a structural view of a main shaft.
Figure 18:
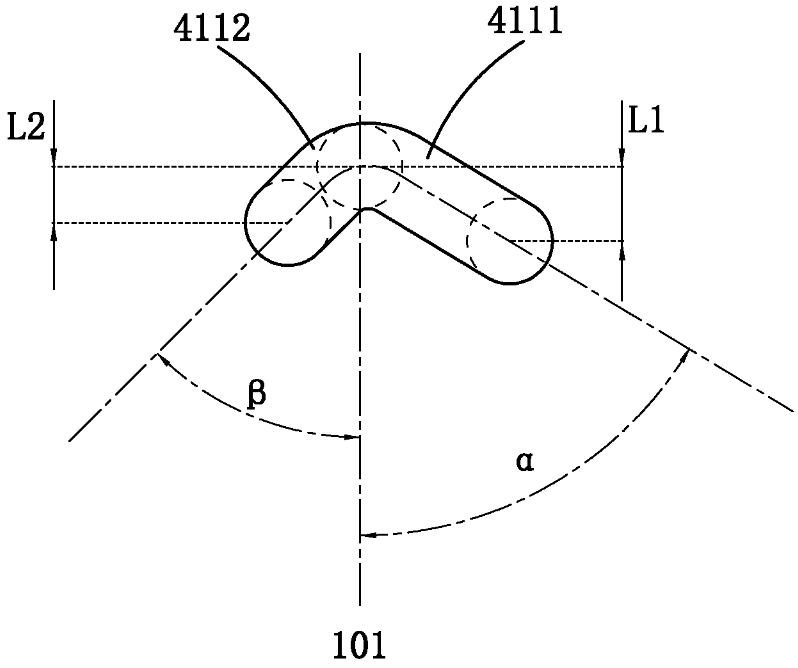
FIG. 18 is an expanded view of a main shaft ball groove along a main shaft cylindrical surface.

FIGS. 16 to 18 show an impact mechanism 40 as another example of the present application. The impact mechanism 40 includes a main shaft 41, an impact block 42 sleeved on the outer circumference of the main shaft 41, a hammer anvil 43 disposed at the front end of the impact block 42, an elastic element 44, and rolling balls 45. The hammer anvil 43 includes an anvil, and the output shaft 131 is formed at the front end of the anvil. It is to be understood that the anvil and the output shaft 131 may be integrally formed or separately formed as independent parts. The impact block 42 includes an impact block body and a pair of first end teeth 421 which are symmetrically disposed on the front end surface of the impact block body in a radial direction and protrude from the front end surface of the impact block body. A pair of second end teeth 431 are symmetrically disposed on the rear end surface of the anvil opposite to the impact block in the radial direction and protrude from the rear end surface of the anvil. The impact block 42 is driven by the main shaft 41, and the hammer anvil 43 mates with the impact block 42 and is struck by the impact block 42.

The impact block 42 is supported on the main shaft 41, rotates integrally with the main shaft 41, and is slidable relative to the main shaft 41 in a reciprocating manner in the axial direction of the main shaft. In this example, the axis of the main shaft coincides with the axis of the motor shaft. Therefore, the impact block 42 slides and rotates relative to the main shaft 41 in a reciprocating manner along the direction of the first axis 101. In other alternative examples, the axis of the main shaft may be parallel to the axis of the motor shaft but does not coincide with the axis of the motor shaft.

The rolling balls 45 connect the impact block 42 to the main shaft 41. In this example, the rolling balls 45 are steel balls. A main shaft ball groove 411 is formed on the outer surface of the main shaft 41. The main shaft ball groove 411 includes a first ball groove 4111 and a second ball groove 4112 that are spirally concave along a main shaft axis 101. When the impact block 42 rotates in a first direction, the rolling ball 45 moves in the first ball groove 4111. When the impact block 42 rotates in a second direction, the rolling ball 45 moves in the second ball groove 4112. A pair of impact ball grooves 422 opened forward and extending backward along the front and rear direction are further disposed on the front end surface of the impact block 42. The main shaft ball groove 411 and the impact ball grooves 422 have semicircular groove bottoms. The rolling ball 45 straddles the impact ball groove 422 and the main shaft ball groove 411, and the impact ball groove 422 and the main shaft ball groove 411 jointly form a ball channel. The rolling ball 45 is disposed between the impact block 42 and the main shaft 41 and is embedded in the ball channel so that the main shaft 41 can drive the impact block 42 to rotate through the rolling ball 45, and the impact block 42 mates with the hammer anvil 43 to drive the hammer anvil 43 to rotate, thereby further driving the output shaft 131 to rotate.

When the impact wrench 100 is completely unable to loosen the fastener during the process of disassembling the fastener, the process of the impact block 42 impacting the hammer anvil 43 may be approximated as an inelastic collision process. During this process, the impact block 42 transfers kinetic energy to the output shaft 131. Since the output shaft 131 cannot rotate the fastener, after part of the kinetic energy is lost, the kinetic energy is transferred back to the impact block 42 by the output shaft 131 so that the impact block 42 rebounds. The impact block 42 rebounds to compress the elastic element 44. In this process, the kinetic energy of the impact block 42 is converted into the potential energy of the elastic element 44. At the same time, the electric motor 12 continues outputting the kinetic energy to the impact mechanism 40, causing the impact mechanism 40 to accumulate energy. When the sum of energy in the impact mechanism 40 is greater than the energy stored in the elastic element 44, the impact block 42 excessively rebounds to impact the main shaft 41, so as to release the excess energy. When this energy is converted into the moment of inertia of the impact block 42 through the elastic element 44, the moment of inertia becomes larger. The greater the moment of inertia, the greater the torque outputted by the impact wrench 100, making it easier to loosen the tightened fastener.

As shown in FIGS. 17 and 18, in this example, along the direction of the main shaft axis 101, the axial length L1 of the first ball groove 4111 is greater than the axial length L2 of the second ball groove 4112, and the ratio of the axial length L1 of the first ball groove 4111 to the axial length L2 of the second ball groove 4112 is greater than or equal to 1.1. In some examples, the ratio of the axial length L1 of the first ball groove 4111 to the axial length L2 of the second ball groove 4112 may also be configured to be greater than or equal to 1.2. In some examples, the ratio of the axial length L1 of the first ball groove 4111 to the axial length L2 of the second ball groove 4112 may also be configured to be greater than or equal to 1.3. The axial length L1 of the first ball groove 4111 is configured to be greater than the axial length L2 of the second ball groove 4112, and the ratio of the axial length L1 of the first ball groove 4111 to the axial length L2 of the second ball groove 4112 is configured to be greater than or equal to 1.1 so that this design can make the maximum return stroke of the impact block 42 longer. In the related art, during the return stroke of the impact block 42, the elastic element 44 is compressed and the kinetic energy is converted into the elastic potential energy. The relationship between the elastic potential energy Ep of the elastic element 44 and the compressed length ΔX is Ep=ΔX^2. In this example, the axial length L1 of the first ball groove 4111 is 5.5 mm, and the axial length L2 of the second ball groove 4112 is 4 mm, so the storage difference of the elastic potential energy is 89%. Compared with the short ball groove (the second ball groove 4112), the long ball groove (the first ball groove 4111) can allow the elastic element 44 to store 89% more energy.

During the process of converting the elastic potential energy of the elastic element 44 into the moment of inertia of the impact block 42, the rolling ball 55 needs to change the direction in the ball channel. It is known in the related art that the angle between the main shaft ball groove 411 and the main shaft axis 101 affects the energy conversion efficiency. In this example, the helix angle α of the first ball groove 4111 is greater than the helix angle β of the second ball groove 4112. Optionally, the ratio of the helix angle α of the first ball groove 4111 to the helix angle β of the second ball groove 4112 is configured to be greater than or equal to 1.1. In some examples, the ratio of the helix angle α of the first ball groove 4111 to the helix angle β of the second ball groove 4112 is configured to be greater than or equal to 1.2. In some examples, the ratio of the helix angle α of the first ball groove 4111 to the helix angle β of the second ball groove 4112 is configured to be greater than or equal to 1.3. In this example, the angle between the first ball groove 4111 and the main shaft axis 101 (that is, the helix angle α of the first ball groove 4111) is configured to be 59°. By optimizing the helix angle of the ball groove, the energy conversion rate of the impact system is higher, and the impact wrench 100 outputs greater torque.

Optionally, the angle between the second ball groove 4112 and the main shaft axis 101 (that is, the helix angle β of the second ball groove 4112) just needs to be sufficient to ensure that the fastener is tightened. If the angle between the second ball groove 4112 and the main shaft axis 101 is configured to be too large, the problem of damaging the fastener due to excessive output torque during the tightening process exists. In this example, the helix angle β of the second ball groove 4112 is configured to be 45°.

The diameter of the main shaft 41 affects the lengths, dimensions, and angles of the first ball groove 4111 and the second ball groove 4112. The larger the diameter of the main shaft 41, the larger a through hole that is disposed in the middle of the impact block 42 and used for accommodating the main shaft 41, leading to the smaller mass of the impact block 42. According to the principle of the moment of inertia, it can be known that the smaller the mass of the impact block 42 is, the harder it is for the impact block 42 to obtain a larger moment of inertia. In this example, the diameter of the main shaft 41 is 14 mm.

In some alternative examples, the impact wrench 100 may also adopt a coordination manner of a control solution and a mechanical structure to accelerate and utilize this energy accumulation phenomenon to implement the function of increasing the one-way torque.

Optionally, the impact wrench 100 has a gear adjustment function so that the impact wrench 100 switches between a normal mode and an enhanced mode. During normal disassembly and assembly, the gear adjustment function is set to the normal mode. At this time, the forward rotation output torque and the reverse rotation output torque of the machine are the same. The conduction angle when the electric motor performs driving is the first set value. When the fastener cannot be disassembled or loosened, the gear adjustment function is set to the enhanced mode, and the conduction angle when the electric motor performs driving is the second set value, where the first set value is less than the second set value. In some examples, the first set value is 90° to 135°. Optionally, the first set value is 120° and the second set value is 150°. Due to the increase in conduction angle, the rotational speed of the loaded electric motor is higher. If the rotational speed of the loaded electric motor is higher, the impact block 42 obtains a greater moment of inertia.

In some examples, during normal disassembly and assembly, the gear adjustment function is set to the normal mode. At this time, the forward rotation output torque and the reverse rotation output torque of the machine are the same. The lead angle when the electric motor performs driving is the third set value. When the fastener cannot be disassembled or loosened, the gear adjustment function is set to the enhanced mode, and the lead angle when the electric motor performs driving is the fourth set value. The fourth set value is greater than the third set value. In some examples, when the impact wrench 100 is in the normal mode, the lead angle when the electric motor performs driving is 0°. When the impact wrench 100 is in the enhanced mode, the lead angle when the electric motor 12 performs driving is any angle in the range of 30° to 60°. In this example, the conduction angle of the electric motor remains unchanged. The rotational speed of the electric motor, that is, the rotational speed of the drive shaft, is adjusted by adjusting the lead angle of the electric motor. It is to be explained that the phase windings of the electric motor lead the back electromotive force by an angle, and this angle is the lead angle. Usually, the electric motor commutates according to a fixed lead angle, thereby further adjusting the lead angle of the electric motor to adjust the rotational speed of the electric motor. The changed lead angle makes the commutation of the electric motor more stable. By changing the control manner of the electric motor, the electric motor can output energy to the impact system more quickly, allowing the impact system to start the energy accumulation process more quickly.

In this example, the first direction is the direction in which the impact wrench 100 performs disassembly through reverse rotation. The first direction may be set to a left-handed rotation direction or a right-handed rotation direction as required to adapt to a left-handed rotation fastener or a right-handed rotation fastener, thereby avoiding the problem of the fastener or screw being unable to be removed from the base due to increased disassembly resistance.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

a motor comprising a drive shaft rotating about a first axis;

an output shaft for outputting torque externally to operate a fastener;

an impact mechanism for applying an impact force to the output shaft, the impact mechanism comprising an impact block and a hammer anvil;

a switching portion configured to set a direction of rotation of the motor to a forward rotation direction in which the fastener is tightened or a reverse rotation direction in which the fastener is loosened; and a controller for controlling the motor;

wherein the controller is configured to:

when the direction of rotation of the motor is set to the reverse rotation direction, the drive shaft rotates at a first speed to drive the impact block to strike the hammer anvil so as to apply the impact force to the output shaft, and, after the impact mechanism applies the impact force to the output shaft for a preset time, control the drive shaft to rotate at a second speed to drive the impact block to strike the hammer anvil when it is determine that the fastener is in a tightened state according to a load parameter of the output shaft, wherein the second speed is greater than the first speed.

2. The impact tool of claim 1, further comprising a speed regulation portion, wherein a rotational speed of the drive shaft is adjusted according to a trigger stroke of the speed regulation portion.

3. The impact tool of claim 2, wherein the first speed is configured to be a speed at which the drive shaft rotates when the trigger stroke of the speed regulation portion is adjusted to a limit.

4. The impact tool of claim 1, further comprising a detection mechanism for detecting the load parameter of the output shaft and an impact state of the impact mechanism.

5. The impact tool of claim 4, wherein the controller acquires an output signal of the detection mechanism, determines that the fastener is in the tightened state according to the output signal, and sends a signal to the motor to control the drive shaft to rotate at the second speed.

6. The impact tool of claim 4, wherein the detection mechanism comprises a first detection assembly for detecting the impact state of the impact mechanism, and the first detection assembly comprises an impact detection portion for determining that the impact mechanism starts to apply the impact force to the output shaft.

7. The impact tool of claim 4, wherein the detection mechanism comprises a first detection assembly for detecting the impact state of the impact mechanism, and the first detection assembly comprises an impact state detection portion for detecting an impact time parameter of the impact mechanism.

8. The impact tool of claim 4, wherein the detection mechanism comprises a second detection assembly for detecting the load parameter of the output shaft, and the load parameter of the output shaft comprises at least one of a rotational speed of the output shaft, an angle of rotation of the output shaft, and rotational acceleration of the output shaft.

9. The impact tool of claim 4, wherein the detection mechanism comprises a third detection assembly for detecting the load parameter of the output shaft, and the load parameter of the output shaft comprises at least one of a rotational speed of the motor, a current of the motor, a motor commutation parameter, and freewheeling time.

10. The impact tool of claim 1, wherein the controller is configured to limit a torque output of the motor when the direction of rotation of the motor is set to a reverse rotation and it is determined that a load of the output shaft is reduced or less than or equal to a preset load according to the load parameter of the output shaft.

11. The impact tool of claim 1, wherein a tightening torque of the impact tool for the fastener when the motor rotates at the first speed is a first output torque, the tightening torque of the impact tool for the fastener when the motor rotates at the second speed is a second output torque, and the first output torque is less than the second output torque.

12. The impact tool of claim 1, wherein an output power of the motor when the motor rotates at the first speed is a first output power, the output power of the motor when the motor rotates at the second speed is a second output power, and the first output power is less than the second output power.

13. The impact tool of claim 1, wherein the controller is further configured to:

when the direction of rotation of the motor is set to the reverse rotation direction, control the motor to start with a first duty cycle signal, determine that the fastener is in the tightened state according to the load parameter of the output shaft, and adjust the motor such that the motor operates with a second duty cycle signal, wherein the first duty cycle is less than the second duty cycle.

14. The impact tool of claim 13, wherein when the direction of rotation of the motor is set to the reverse rotation direction, the motor is controlled to start with the first duty cycle signal, it is determined that the fastener is in a loosened state according to the load parameter of the output shaft, and the controller controls the motor to operate with the first duty cycle signal.

15. The impact tool of claim 1, wherein the impact mechanism comprises a main shaft driven by the drive shaft, an impact block driven by the main shaft, and a hammer anvil that mates with the impact block and is struck by the impact block, wherein the impact block is rotatable and axially movable relative to the hammer anvil to apply a continuous rotational impact to the hammer anvil.

16. An impact tool, comprising:

a motor comprising a drive shaft rotating about a first axis;

an output shaft for outputting torque externally to operate a fastener;

an impact mechanism for applying an impact force to the output shaft, the impact mechanism comprising an impact block and a hammer anvil;

a switching portion configured to set a direction of rotation of the motor to a forward rotation direction in which the fastener is tightened or a reverse rotation direction in which the fastener is loosened; and a controller for controlling the motor;

wherein the controller is configured to:

when the direction of rotation of the motor is set to the reverse rotation direction and the impact block is striking the hammer anvil to apply the impact force to the output shaft, detect a parameter indicating a load of the output shaft, determine that the fastener is in a tightened state according to the parameter, and automatically send the motor a signal for improving a speed of the drive shaft.

17. An impact tool, comprising:

a motor comprising a drive shaft rotating about a first axis;

an output shaft for outputting torque externally to operate a fastener;

an impact mechanism for applying an impact force to the output shaft, the impact mechanism comprising an impact block and a hammer anvil;

a switching portion configured to set a direction of rotation of the motor to a forward rotation direction in which the fastener is tightened or a reverse rotation direction in which the fastener is loosened; and a controller for controlling the motor;

wherein the controller is configured to, when the direction of rotation of the motor is set to the reverse rotation direction and the impact block is striking the hammer anvil to apply the impact force to the output shaft, control the motor to start with a first duty cycle signal, and, when it is determined that the fastener is in a tightened state according to a load parameter of the output shaft, adjust the motor such that the motor operates with a second duty cycle signal, wherein the first duty cycle is less than the second duty cycle.

18. The impact tool of claim 17, wherein the controller is configured to, when the direction of rotation of the motor is set to the reverse rotation direction, control the motor to start with the first duty cycle signal, and, when it is determined that a load of the output shaft is less than or equal to a preset load according to the load parameter of the output shaft, keep the motor operating with the first duty cycle signal.

19. The impact tool of claim 18, wherein when the controller controls the motor to operate with the first duty cycle signal, the controller limits a torque output of the motor according to an operation instruction of a user.

20. The impact tool of claim 18, wherein, when the controller controls the motor to operate with the second duty cycle signal and it is determined that the load of the output shaft is reduced or less than or equal to the preset load according to the load parameter of the output shaft, the controller limits a torque output of the motor.

* * * * *